(12) United States Patent
Cronin et al.

(10) Patent No.: US 12,494,857 B2
(45) Date of Patent: Dec. 9, 2025

(54) BROADCASTING CONTEXTUAL INFORMATION THROUGH MODIFICATION OF AUDIO AND VIDEO INTERFACES

(71) Applicant: JVCKENWOOD Corporation, Yokohama (JP)

(72) Inventors: Harry Michael Cronin, Cambridge (GB); Jan Jasper van den Berg, London (GB); Christopher John Wright, London (GB); David Michael Duffy, Zurich (CH); Phil Peter Catton, Cambridge (GB)

(73) Assignee: JVCKENWOOD Corporation, Yokohama (JP)

( * ) Notice: Subject to any disclaimer, the term of this patent is extended or adjusted under 35 U.S.C. 154(b) by 480 days.

(21) Appl. No.: 17/655,534

(22) Filed: Mar. 18, 2022

(65) Prior Publication Data
US 2022/0311527 A1    Sep. 29, 2022

Related U.S. Application Data

(60) Provisional application No. 63/167,461, filed on Mar. 29, 2021.

(51) Int. Cl.
*H04H 20/65* (2008.01)
*H04B 11/00* (2006.01)
*H04H 20/61* (2008.01)

(52) U.S. Cl.
CPC ............ *H04H 20/65* (2013.01); *H04B 11/00* (2013.01); *H04H 20/61* (2013.01)

(58) Field of Classification Search
CPC ......... H04L 67/12; H04L 9/0668; H04L 9/14; H04L 43/16; H04L 67/125;
(Continued)

(56) References Cited

U.S. PATENT DOCUMENTS

2015/0149186 A1*   5/2015   Rao ................. G06F 16/955
                                                            704/500
2019/0212966 A1    7/2019   Lee et al.
(Continued)

FOREIGN PATENT DOCUMENTS

| CN | 110868426 A | 3/2020 |
| WO | 2017139317 A1 | 8/2017 |
| WO | 2019114950 A1 | 6/2019 |

OTHER PUBLICATIONS

European Search Report dated Mar. 6, 2025 cited in EP Application No. 22715790.6, 4 pages.
(Continued)

*Primary Examiner* — Golam Sorowar
(74) *Attorney, Agent, or Firm* — Perkins Coie LLP; Andrew T. Pettit

(57) ABSTRACT

Introduced here are approaches to transferring relevant information from a first electronic device (also called a "source electronic device") that is presently outputting an interfacing signal that is detectable by a second electronic device (also called a "recipient electronic device") via modification of the interfacing signal. Such modification causes the relevant information to be appended to the interfacing signal and then transferred to the recipient electronic device. This can be accomplished by superimposing another signal that is representative of the relevant information onto the interfacing signal. Thus, the relevant information can be transferred from the source electronic device to the recipient electronic device by superimposing a signal onto the interfacing signal that is output by the source electronic device.

12 Claims, 13 Drawing Sheets

(58) Field of Classification Search
CPC ............. H04L 12/2801; H04L 12/2803; H04L 12/2838; H04L 12/2869; H04L 12/2898; H04L 27/0006; H04L 27/26; H04L 27/2637; H04L 41/0806; H04L 41/5003; H04L 43/10; H04L 47/821; H04L 5/0007; H04L 5/0037; H04W 72/0453; H04W 4/80; H04W 84/12; H04W 76/14; H04W 88/06; H04W 16/14; H04W 72/541; H04W 4/023; H04W 52/52; H04W 72/0446; H04W 72/1215; H04W 4/029; H04W 24/08; H04W 28/0236; H04W 28/18; H04W 36/04; H04W 36/08; H04W 4/027; H04W 4/70; H04W 48/18; H04W 56/001; H04W 72/542
See application file for complete search history.

(56) References Cited

U.S. PATENT DOCUMENTS

| | | | | |
|---|---|---|---|---|
| 2020/0256972 A1* | 8/2020 | Eckert | ................. | G01S 13/86 |
| 2020/0286474 A1* | 9/2020 | Shoop | ................. | G06F 3/165 |
| 2020/0321005 A1* | 10/2020 | Iyer | ................. | G10L 15/193 |

OTHER PUBLICATIONS

International Search Report and Written Opinion dated Oct. 10, 2022 cited in PCT/JP2002/014320, 17 pages.
Kays, Ruediger "Visible light communication using TV displays and video cameras", 2015 IEEE International Conference On Consumer Electronics (ICCE), Jan. 2015, pp. 554-555.

\* cited by examiner

600

601

Output a first stream of encoded data that is audibly or visually detectable by a user

602

Determine that information is to be shared with a recipient electronic device

603

Generate or retrieve a second stream of encoded data that is indicative of the information

604

Transfer the information to the recipient electronic device by combining the second stream of encoded data with the first stream of encoded data, so as to create a third stream of encoded data

605

Output the third stream of encoded data for detection by the recipient electronic device

FIGURE 6

BROADCASTING CONTEXTUAL INFORMATION THROUGH MODIFICATION OF AUDIO AND VIDEO INTERFACES

CROSS-REFERENCE TO RELATED APPLICATIONS

This application claims priority to U.S. Provisional Application No. 63/167,461, titled "Contextual Data Broadcasts Via Audio-Visual Interface Modifications" and filed on Mar. 29, 2021, which is incorporated by reference herein in its entirety.

TECHNICAL FIELD

The present disclosure pertains to wireless communication of information and, more specifically, to approaches to wirelessly communicating information between electronic devices through modification of content that is audibly or visually detectable.

BACKGROUND

With electronic devices constantly being made available for the developing Internet of Things (IoT), individuals expect to be connected—to the Internet, electronic devices, and each other—much of the time. Historically, this has been enabled through wireless network protocols that are collectively referred to as "Wi-Fi." These wireless network protocols allow nearby electronic devices to exchange data using radio waves.

The demand for better connectivity has increased the expectations for nearly all electronic devices to have the capability to process audio or video in real time and then locally perform digital signal processing. With these capabilities in mind, companies have begun developing new technologies for facilitating wireless interactions between electronic devices. One of these technologies is data-over-sound. Data-over-sound enables the exchange of data between a first electronic device (also called the "source electronic device") that includes an audio output component and a second electronic device (also called the "recipient electronic device") that includes an audio input mechanism.

At a high level, data-over-sound functions similar to a Quick Response (QR) code except that data is transferred over an acoustic channel. In practice, data is encoded into an acoustic signal by the first electronic device, for example, as a series of tones to form an "acoustic barcode." Then, the first electronic device emits the acoustic signal for reception by the second electronic device. Upon receipt, the second electronic device demodulates the acoustic signal so as to decode the data that is encoded therein.

BRIEF DESCRIPTION OF THE DRAWINGS

FIG. 6 includes a flow diagram of a process performed by a source electronic device to transfer information to a recipient electronic device.

Figure 1:
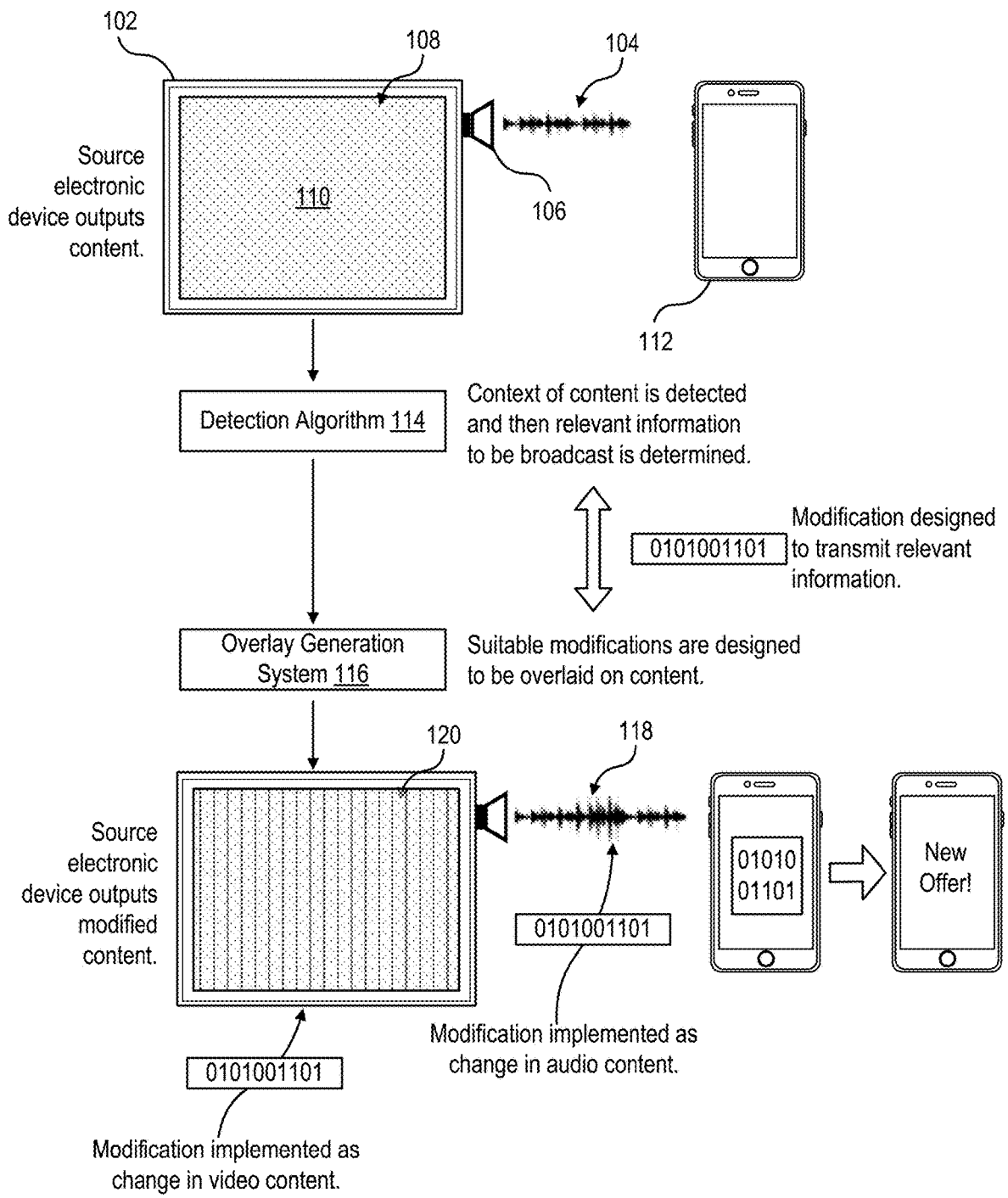
FIG. 1 includes a high-level illustration showing how relevant information could be overlaid on an interfacing signal output by a source electronic device.

Various features of the technologies described herein will become more apparent to those skilled in the art from a study of the Detailed Description in conjunction with the drawings. Embodiments are illustrated by way of example and not limitation in the drawings. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

There are several benefits of transferring data over sound—a concept that is commonly referred to as "acoustic data transmission" or "data-over-sound." Normally, acoustic data transmission is accomplished using inaudible sound signals (also called "ultrasonic sound signals"), though acoustic data transmission could be accomplished using audible sound signals. As such, acoustic data transmission may be largely, if not entirely, sensorily imperceptible to nearby individuals. Moreover, because acoustic connection relies on audio output and input components, many electronic devices that are currently in use are able to participate in data-over-sound. Simply put, acoustic data transmission is compatible with electronic devices of different form factors, architectures, and the like. As an example, an ultrasonic sound signal may be broadcast by a given electronic device as an "advertising cookie" that can be collected and examined by the "always on" audio input components of nearby electronic devices. Acoustic data transmission is also secure since unauthorized access would require that the responsible individuals (also called "hackers") be located near the electronic device from which the sound signal is emitted in order to access the data encoded therein.

Acoustic data transmission does suffer from several drawbacks, however.

As an example, while acoustic data transmission does not require any network like the Internet, implementing the necessary framework generally does require a connection to a network. Assume, for example, that data is to be transferred from a source electronic device to a recipient electronic device over sound. In such a scenario, the source electronic device may require a framework that indicates, for example, when or how to transfer the data to the recipient electronic device. The term "framework" may refer to a collection of algorithms, heuristics, or rules that control or influence how acoustic data transmission effected by the source electronic device. Generally, the framework is implemented via software.

However, many electronic devices are unable to initiate connections with networks. As an example, despite the relatively rapid adoption of network-connected point-of-sale systems (also called "payment systems"), many legacy payment systems remain deployed. In fact, research indicates that roughly 93 percent of the payment systems deployed within the United States in 2020 are not "cloud compatible." Similarly, the vast majority of legacy advertisement systems are not "cloud compatible" These legacy payment systems and advertisement systems do typically include either an audio output component or a video output component, however.

As another example, acoustic data transmission may be impractical or impossible in some situations. In particular, acoustic data transmission has historically not been suitable for implementation with audible content that is streaming to one or more recipient electronic devices. This makes acoustic data transmission difficult to implement in time-sensitive situations, such as transmitting receipts for payment transactions and delivering advertisements, since the data being transferred is related to a given point in time (and therefore, timeliness is essential).

Introduced here, therefore, are approaches to transferring relevant information from a source electronic device that is presently outputting an interfacing signal to a recipient electronic device via modification of the interfacing signal. Such modification causes the relevant information to be appended to the interfacing signal and then transferred to the recipient electronic device. This can be accomplished by superimposing another signal that is representative of the relevant information onto the interfacing signal. Thus, the relevant information can be transferred from the source electronic device to the recipient electronic device by superimposing a signal onto the interfacing signal that is output by the source electronic device.

As further discussed below, the nature of the interfacing signal (and therefore, the superimposed signal representative of the relevant information) may depend on the capabilities of the source electronic device and recipient electronic device. Assume, for example, that the source electronic device includes (i) an audio output component able to output audio signals and (ii) a video output component able to output video signals. In such a scenario, the interfacing signal could be representative of an audio signal that is emitted by the audio output component, or the interfacing signal could be representative of a video signal that is displayed by the video output component.

Accordingly, the superimposed signal may be included in a way that is dependent on the context and content of the interfacing signal, nature of the source electronic device, or nature of the recipient electronic device. In some embodiments, the relevant information is transferred by the design of an ultrasonic sound signal that encodes the relevant information in a way that is audibly detectable by the recipient electronic device but not audibly detectable by an individual associated with the recipient electronic device. In other embodiments, the relevant information is transferred by the design of a video modification that encodes the relevant information in a way that is detectable—visually or otherwise—by the recipient electronic device but not visually detectably by the corresponding individual. For example, the video modification may be designed and implemented so as to be detectable by a radar system included in the recipient electronic device. One example of a radar system is a millimeter-wave (mmWave) radar system that includes (i) a transmitter able to produce electromagnetic waves in the millimeter (mm) range, (ii) a first antenna able to transmit electromagnetic waves in the mm range, and (iii) a second antenna able to receive electromagnetic waves in the mm range. Generally, the terms "mm range" and "mmWave range" refer to the portion of the electromagnetic spectrum between 24 gigahertz (GHz) and 300 GHz. A second detection method of relevance is Optical Camera Communication (OCC), in which the video modifications are designed according to one of the schemes known in the art to be detectable to an image sensor included in the electronic device that has visual line-of-sight to the display on which the video modification is presented.

In some embodiments, the content of the superimposed signal is determined based on a real-time analysis of the content of the interfacing signal. For example, the superimposed signal could include information regarding a product mentioned or shown in the interfacing signal, or the superimposed signal could include a digital receipt for a payment transaction facilitated or completed using the interfacing signal. Additionally or alternatively, the timing of the superimposed signal may be determined based on a real-time analysis of the content of the interfacing signal. Said another way, the portion of the interfacing signal over which the superimposed signal is overlaid may depend on the content of the interfacing signal. For example, if the superimposed signal includes information regarding a product mentioned or shown in the interfacing signal over an interval of time, then the superimposed signal may be combined with the interfacing signal over the interval of time, so as to make the information accessible as the product is being mentioned or shown. As another example, if the superimposed signal includes a digital receipt for a payment transaction facilitated or completed using the interfacing signal, then the superimposed signal may be combined with the interfacing signal in response to a determination, based on an analysis of the interfacing signal, that the payment transaction is complete.

The superimposed signal could also be uniquely linked to the recipient electronic device (and therefore, the individual associated with the recipient electronic device). The superimposed signal may be uniquely linked to the recipient electronic device via timing, content, and other features such as location (e.g., as determined based on Global Positioning System coordinates, Internet Protocol address, etc.). Thus, the (i) content of the first signal, (ii) content of the second signal, or (iii) the manner in which the second signal is superimposed on the first signal causes the second signal to be uniquely associated with the recipient electronic device.

Assume, for example, that the source electronic device is tasked with transferring information to multiple recipient electronic devices. In such a scenario, the information relevant to each recipient electronic device can be superimposed over a different section of the interfacing signal. This allows the source electronic device to sequentially communicate information to the multiple recipient devices.

Receipt of the interfacing signal and subsequent decoding of the superimposed signal by the recipient electronic device could also permit other functionalities. For example, certain user interface (UI) features may be made accessible on the recipient electronic device for interaction for a certain amount of time (e.g., so long as the superimposed signal is detectable by the recipient electronic device). In this way, the superimposed signal can act as a beacon that permits contextualized data to be provided based on location.

For the purpose of illustration, embodiments may be described in the context of transferring relevant information in a given context. For example, embodiments may be described in the context of supplementing advertisements with related information or provisioning digital receipts for payment transactions. However, the approaches described herein may be similarly applicable to other contexts that would benefit from the wireless transfer of data from one electronic device to another electronic device.

While not required, implementations are described below in the context of instructions that are executable by an electronic device. The term "electronic device" is generally used interchangeably with the term "computing device," and thus may be used to refer to computer servers, payment systems, advertisement systems, tablet computers, mobile phones, wearable devices (e.g., fitness trackers and watches), and the like.

While aspects of the technology, such as certain modules, may be described as being performed exclusively or primarily by a single electronic device, some implementations are practiced in distributed environments where modules are shared among multiple electronic devices that are linked through a network. For example, an individual may indicate that additional information regarding a product shown by an advertisement system is desired. In such a scenario, the advertisement system may retrieve the information from a computer server that is accessible via a network (e.g., the Internet) and then transfer the information to a mobile phone associated with the individual as discussed above. Alternatively, the information could be stored on the advertisement system, and thus the advertisement system may not need to be connected to the network.

Terminology

References in this description to "an embodiment" or "one embodiment" means that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and variants thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" may refer to software components, firmware components, or hardware components. Modules are typically functional components that generate one or more outputs based on one or more inputs. As an example, a computer program may include multiple modules responsible for completing different tasks or a single module responsible for completing all tasks.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

Introduction to Conveying Information Through Signal Manipulation

FIG. 1 includes a high-level illustration showing how relevant information could be overlaid on an interfacing signal output by a source electronic device 102. As mentioned above, the interfacing signal could be an audio signal 104 that is output by an audio output component 106, or the interfacing signal could be a video signal 108 that is output by a video output component 110.

At a high level, the approach introduced here allows relevant information to be overlaid on the interfacing signal, so as to be transferred to a recipient electronic device 112. While the source electronic device 102 and recipient electronic device 112 may have a network connection (e.g., via respective antennas), it may not be possible for these devices to directly connect with one another. Additionally or alternatively, the source electric device 102 may not be capable of determining which electronic devices, if any, are located within a given proximity to allow linking via wireless communication channels. The approach introduced here allows the relevant information to be transferred from the source electronic device 102 to the recipient electronic device 112 even in these scenarios.

As further discussed below, a context detection algorithm 114 (or simply "detection algorithm") may be responsible for detecting the context of the content of the interfacing signal. Based on the context, relevant information can then be identified that is to be broadcast to the recipient electronic device 112. Generally, the content is analyzed by the detection algorithm 114 locally (i.e., on board the source electronic device 102), though the content could be examined by the detection algorithm 114 elsewhere. For example, the detection algorithm 114 may be executed by another electronic device (e.g., a computer server) to which the source electronic device is communicatively connected in some embodiments.

Thereafter, an appropriate modification that is designed to transmit the relevant information can be identified by an overlay generation system 116. As further discussed below with reference to FIG. 2, the overlay generation system 116 can include a modification algorithm, a superimposition algorithm, a signal database, or any combination thereof. Suitable modifications can be designed to be overlaid on the interfacing signal, so as to allow the relevant information to be broadcast to nearby electronic devices, such as the recipient electronic device 112. For example, the relevant information may be broadcast via a modification of the audio signal 104, such that the modification is detectable by an audio input component. As another example, the relevant information may be broadcast via a modification of the video signal 108, such that the modification is detectable by a video input component or some other sensor (e.g., a mmWave radar system).

For the purpose of illustration, the modification is shown as a binary string—namely, 0101001101—that can be overlaid on the interfacing signal, so as to produce a manipulated signal. By overlaying the modification on the audio signal 104, the overlay generation system 116 can produce a manipulated audio signal 118 that can be broadcast for detection by the recipient electronic device 112. Similarly, by overlaying the modification on the video signal 108, the overlay generation system 116 can produce a manipulated video signal 120 that can be broadcast for detection by the recipient electronic device 112.

Normally, the overlay generation system 116 only manipulates one of the audio signal 104 and video signal 108. However, there may be scenarios where the overlay generation system 116 manipulates the audio signal 104 and video signal 108. For example, a manipulated audio signal 118 and manipulated video signal 120 may be broadcast for detection by the recipient electronic device 112 if the manipulation platform of which the detection algorithm 114 and overlay generation system 116 are a part is not sure which of those signals the recipient electronic device 112 will be able to detect. As another example, a manipulated audio signal 118 and manipulated video signal 120 may be broadcast for detection by the recipient electronic device 112 if the manipulation platform is interested in dividing the relevant information (e.g., for privacy purposes, due to bandwidth or latency of those channels, etc.). In embodiments where a manipulated audio signal 118 and manipulated video signal 120 are broadcast for detection, those signals may include the same information or different information.

As shown in FIG. 1, the recipient electronic device 112 can detect the manipulated signal that is broadcast by the source electronic device 102. If the manipulated signal is a manipulated audio signal 118, then the recipient electronic device 112 may detect the manipulated signal via an audio input component. If the manipulated signal is a manipulated video signal 120, then the recipient electronic device 112 may detect the manipulated signal via a video input component or some other sensor (e.g., a mmWave radar system that is able to sense the video screen state). Data can then be decoded by the recipient electronic device from the manipulated signal. Based on this data and other features (e.g., timing and location), relevant information can be provided to a user of the recipient electronic device 112. Examples of relevant information include personalized offers for brands, products, and merchants, digital receipts for payment transactions, and the like.

Overview of Signal Manipulation Platform

Figure 2:
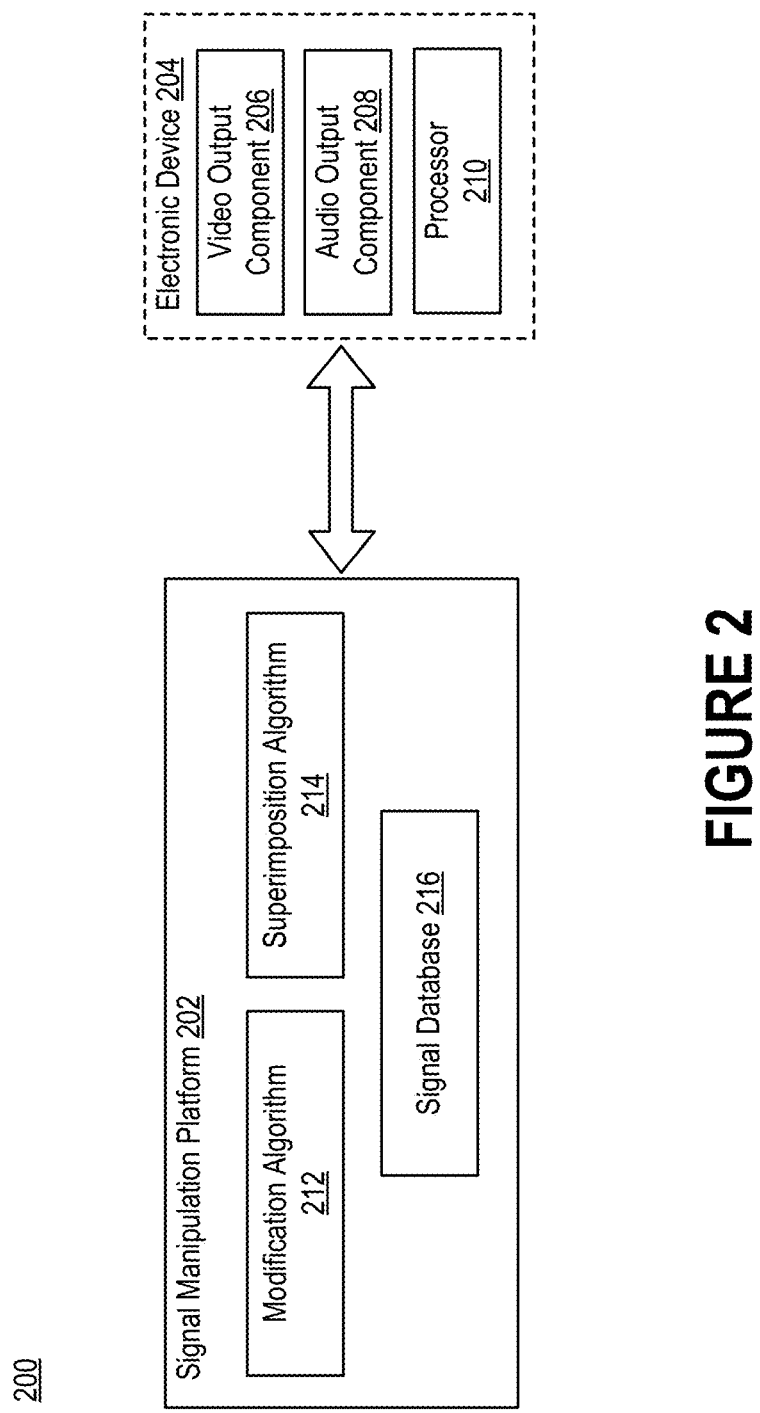
FIG. 2 includes a high-level representation of a system that can be used to broadcast machine-interpretable encoded data from an electronic device to one or more other electronic devices.

FIG. 2 includes a high-level representation of a system 200 that can be used to broadcast machine-interpretable encoded data from an electronic device 204 to one or more other electronic devices (not shown). For the purpose of illustration, the electronic device 204 may be called the "source electronic devices" while the other electronic devices may be called the "recipient electronic devices". To broadcast the machine-interpretable encoded data, a signal manipulation platform 202 (or simply "manipulation platform") can manipulate an interfacing signal that is output by the electronic device 204. For example, the manipulation platform 204 may manipulate a video signal that is shown by a video output component 206 of the electronic device 204, or the manipulation platform 204 may manipulate an audio signal that is emitted by an audio output component 208 of the electronic device 204. These manipulations can be designed and implemented in such a manner that the resulting change to the video signal or audio signal may be largely, if not entirely, sensorily imperceptible to individuals associated with the recipient electronic devices. These individuals may be referred to as "users" of the recipient electronic devices.

Note that the term "sensorily perceptible" may refer to a stimulus that can be seen, noticed, or otherwise detected by means of the senses of a typical human being. Stimuli could be visually perceptible, audibly perceptible, tactilely perceptible, etc. Examples of visual stimuli include still pictures and dynamic pictures, and examples of audible stimuli include audiobooks, podcasts, radio broadcasts. Some stimuli may be perceptible by more than one of the senses (e.g., video signals may be visually and audibly perceptible). Accordingly, the term "sensorily imperceptible" may be used to refer to a stimulus that cannot be seen, noticed, or otherwise detected by means of the senses of a typical human being.

Assume, for example, that an individual visits a retail establishment in which audible content is being emitted. As the individual traverses the retail establishment, the underlying audio signal may be manipulated so as to include information regarding a product offered by the retail establishment or the retail establishment itself. For example, the information may be a hyperlink (or simply "link") to a website that includes details regarding products or promotions offered by the retail establishment. While this will cause the underlying audio signal to be manipulated, the manipulation may not be detectable by the human ear. Accordingly, the individual may not be aware that the underlying audio signal has been manipulated, though her electronic device may detect the manipulation. By decoding the manipulated audio signal, the electronic device can "uncover" the information. A similar process for transferring information via modifications of audible content could be carried out while the individual is listening to a podcast in her home, listening to the radio in her vehicle, walking through a public environment such as a shopping center or airport, etc.

As another example, assume that an individual is traversing a public or private environment while wearing an augmented reality headset (also called a "mixed reality headset"). As the individual traverses the environment, she may observe display panels that visually present content related to products, people, events, and the like. As further discussed below, the visual content shown on these display panels could be manipulated so as to include information regarding those products, people, events, and the like. For example, if the content pertains to a musical performance by a given artist, the information may be a link to a website through which tickets for the musical performance can be purchased. As another example, if the content pertains to a movie being shown in theaters, the information may be a link to a trailer for the movie. Once again, manipulation will cause a change in the underlying video signal; however, the manipulation may not be detectable by the human eye. Accordingly, the individual may not be aware that the underlying video signal has been manipulated, though her mixed reality headset may detect the manipulation. By decoding the manipulated video signal, the mixed reality headset can "uncover" the information. A comparable process could be performed by other types of electronic devices that include sensors (e.g., image sensors) capable of visually monitoring the environment. Examples of such electronic devices include mobile phones, wearable cameras, and some watches and fitness accessories. As a specific example, a mobile phone may be able to detect modifications of visual content as it is panned about an environment that includes a display panel.

As shown in FIG. 2, the system 200 includes a manipulation platform 202 that may have access to a video output component 206, audio output component 208, processor 210, or any combination thereof. Those skilled in the art will recognize that all of these components need not necessarily be included in the electronic device 204. For example, the electronic device 204 may include an audio output component 208 but not a video output component 206 in some embodiments. In other embodiments, the electronic device 204 may include a video output component 206 but not an audio output component 208. The electronic device 204 could also include other components in addition to those shown in FIG. 2. For example, the electronic device 204 could include an audio input component in addition to the audio output component 208, so as to allow for audible interaction between the electronic device 204 and recipient electronic devices or users of those devices. One example of an audio input component is a microphone that is designed to convert sound into electrical impulses to form a signal that can be handled by the other components of the electronic device 204.

The video output component 206 can be any mechanism that is operable to visually convey content of a video signal to an individual and a corresponding recipient electronic device. For example, the video output component 206 may be a display panel that includes light-emitting diodes (LEDs), organic LEDs, liquid crystal elements, or electrophoretic elements.

The audio output component 208 can be any mechanism that is operable to audibly convey content of an audio signal to an individual and a corresponding recipient electronic device. For example, the audio output component 208 may be a loudspeaker (or simply "speaker") that is designed to convert electrical impulses into sound.

This electronic device 204 may be referred to as an "audio-video device" or "audio-visual device" since it is capable of outputting an audio signal with the audio output component 208 and outputting a video signal with the video output component 206. As discussed above, in operation, this electronic device 204 may output an interfacing signal that is detectable by a user. In embodiments where the interfacing signal is representative of an audio signal, this electronic device 204 may be described as generating or supporting an "audio interface" with which users can interact. In embodiments where the interfacing signal is representative of a video signal, this electronic device 204 may be described as generating or supporting a "video interface" or "visual interface" with which users can interact. In some scenarios, this electronic device 204 may output multiple interfacing signals, for example, an audio signal that is output by the audio output component 208 and a video signal that is output by the video output component 206. In such embodiments, this electronic device 204 may be described as generating or supporting an "audio-video interface" or "audio-visual interface" with which users can interact. As further discussed below, the manipulation platform 202 could manipulate one or both of these interfacing signals.

As shown in FIG. 2, the manipulation platform 202 may include a signal modification algorithm 212 (or simply "modification algorithm"), a signal superimposition algorithm 214 (or simply "superimposition algorithm"), and a signal database 216. The signal database 216 may store various signals that are representative of information that can be shared with recipient electronic devices. Said another way, the signal database 216 may store various signals that can be superimposed on an interfacing signal output by the electronic device 204. As further discussed below, the signals in the signal database 216 may vary depending on the nature of the interfacing signal output by the electronic device 204, the components of the electronic device 204, or the components of the recipient electronic devices. Thus, the signal database 216 can include acoustic signals, video signals, or a combination thereof. The signals in the signal database 216 may be encrypted, hashed, or otherwise obfuscated to prevent unauthorized access.

In some embodiments, the manipulation platform 202 is configured to generate the signal to be superimposed on the interfacing signal in near real time. For example, the manipulation platform 202 may create the signal to be superimposed on the interfacing signal based on a real-time analysis of content of the interfacing signal. As another example, the manipulation platform 202 may create the signal to be superimposed on the interfacing signal based on one or more characteristics of the recipient electronic device (e.g., learned through analysis of a communication sent from the recipient electronic device to the electronic device 204 in the form of one or more data packets). In embodiments where the signal is generated by the manipulation platform in near real time, the signal may not be stored in the signal database 216 at all, or the signal may only be stored in the signal database 216 for a short amount of time (e.g., several seconds or less) until the transfer of information is complete.

When executed by the processor 210, the algorithms implemented in the manipulation platform 202 allow information to be transferred from the electronic device 204 to a recipient electronic device via manipulation of an interfacing signal that can be audibly or visually sensed. To accomplish this, the manipulation platform 202 may complete two phases, each of which may correspond to a different algorithm as shown in FIG. 2.

In a first phase (also referred to as a "modification phase" or "creation phase"), a modification algorithm 212 can create a signal that is representative of the information to be shared with the recipient electronic device. This can occur in various ways. In some embodiments, the modification algorithm 212 obtains a signal from the signal database 216 based on the content of the interfacing signal or a characteristic of the recipient electronic device or its user. This signal could be used without any modification (i.e., in its "raw form"), or this signal could be modified by the modification algorithm 212 so as to be tailored for the interfacing signal, recipient electronic device, or user of the recipient electronic device. In other embodiments, the modification algorithm 212 generates the signal in near real time based on an analysis of the interfacing signal on which the signal is to be superimposed.

In a second phase (also referred to as a "superimposition phase" or "transfer phase"), a superimposition algorithm 214 can superimpose the signal on the interfacing signal, such that the information to be transferred to the recipient electronic device can be "carried with" the interfacing signal. Superimposition can be performed such that the interfacing signal suffers only minimal degradation. As such, the modification resulting from superimposition of the signal onto the interfacing signal may be largely, if not entirely, sensorily imperceptible to the user of the recipient electronic device, yet still readily detectable by the recipient electronic device itself.

As mentioned above, the interfacing signal may be representative of an audio signal in some embodiments. Thus, information can be transferred from the electronic device 204 to a recipient electronic device by superimposing a second audio signal (e.g., an ultrasonic audio signal) onto the audio signal that serves as the interfacing signal. In such embodiments, the timing of information transfer may be optimized based on an analysis of the content (e.g., spoken words, non-lexical utterances, etc.) included in the interfacing signal. Said another way, the portion of the interfacing signal over which the second audio signal is to be superimposed can be determined based on an analysis of the content of the interfacing signal. Additionally or alternatively, the portion of the interfacing signal could be specified by, or determined based on, input received by the manipulation platform 202 that indicates the information is to be transferred. Those skilled in the art will recognize that the interfacing signal could be accompanied by another interfacing signal in some situations. For example, the electronic device 204 may output a first interfacing signal that includes spoken content related to a product or service and a second interfacing signal that includes visual content related to the product or service. In such scenarios, the timing of information transfer could be optimized based on the content of the first interfacing signal, the content of the second interfacing signal, or a combination thereof.

In other embodiments, the interfacing signal is representative of a video signal. In such embodiments, superimposition of a second audio signal onto the video signal that serves as the interfacing signal may result in a visual modification of content. This visual modification may be visible to the human eye, or this visual modification may be imperceptible to the human eye but detectable by the recipient electronic device. Examples of visual modifications include watermarks, flicker patterns, and changes in color scheme. In embodiments where the interfacing signal is representative of a video signal, the timing of information transfer may be based on an analysis of the content of the interfacing signal. For example, information may be transferred from the electronic device 204 to a recipient electronic device in response to a determination that the interfacing signal output by video output component 206 includes a certain message (e.g., "Thank you for your purchase."), content (e.g., a website that confirms a payment transaction was completed), etc. As further discussed below, various sensors included in the recipient electronic device could be used to detect, parse, or otherwise comprehend the second video signal that is superimposed on the interfacing signal. For example, the manipulation platform 202 could be used to design suitable video signal modifications to transfer the information in a manner that is optimized for detectability via a mmWave radar system.

Figure 3:
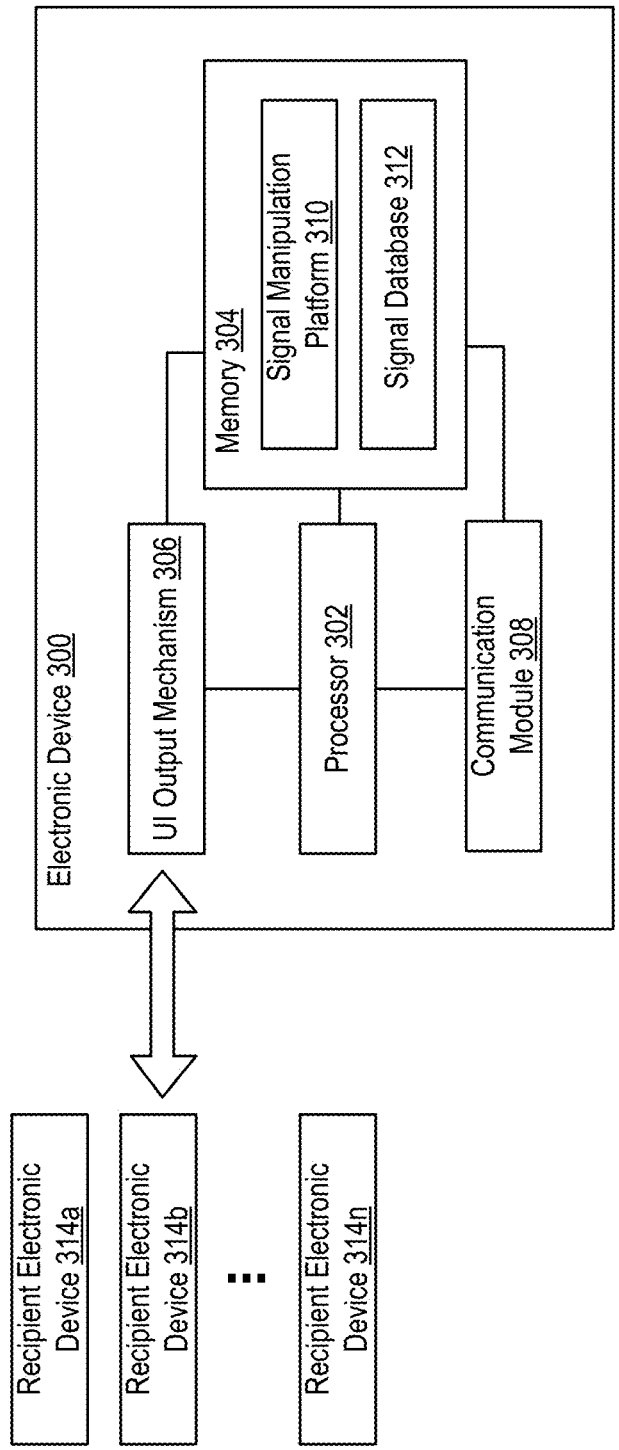
FIG. 3 illustrates an example of an electronic device able to implement a manipulation platform that is designed to manipulate an interfacing signal to transfer information to a recipient electronic.

FIG. 3 illustrates an example of an electronic device 300 able to implement a manipulation platform 310 that is designed to manipulate an interfacing signal to transfer information to a recipient electronic device. As discussed above, the interfacing signal may be representative of an audio signal or video signal that is modified when another signal is superimposed thereon. While the modification is detectable by the recipient electronic device to which the information is to be transferred, the modification may not necessarily be detectable by its user.

In some embodiments, the manipulation platform 310 is embodied as a computer program that is executed by the electronic device 300. For example, the manipulation platform 310 may reside on a payment system, in which case the modifications introduced to the interfacing signal may be representative of digital receipts that are communicated to individuals who complete payment transactions using respective recipient electronic devices. As another example, the manipulation platform 310 may reside on an advertising system, which case the modifications introduced to the interfacing signal may be representative of links to additional information regarding a product or service shown on the advertising system. Those skilled in the art will recognize that aspects of the manipulation platform 310 could also be distributed amongst multiple electronic devices. As an example, the manipulation platform 310 may reside on a first electronic device (e.g., a payment system, advertising system, etc.) while the signal database 312 may reside on a second electronic device (e.g., a computer server).

The electronic device 300 can include a processor 302, memory 304, UI output mechanism 306, and communication module 308.

The processor 302 can have generic characteristics similar to general-purpose processors, or the processor 302 may be an application-specific integrated circuit (ASIC) that provides control functions to the electronic device 300. As shown in FIG. 3, the processor 302 can be coupled to all components of the electronic device 300, either directly or indirectly, for communication purposes. In embodiments where the manipulation platform 310 is embodied as a computer program, the underlying instructions can be executed by the processor 302 so as to allow the electronic device 300 to carry out the operations described herein.

The memory 304 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 302, the memory 304 can also store (i) data that is output by the UI output mechanism 306 and (ii) data that is generated by the processor 302 (e.g., when executing the algorithms, heuristics, or rules of the manipulation platform 310). Note that the memory 304 is merely an abstract representation of a storage environment. The memory 304 could be comprised of actual integrated circuits (also referred to as "chips") or modules.

The communication module 308 may be responsible for managing communications between the components of the electronic device 300. Additionally or alternatively, the communication module 308 may be responsible for managing communications with other electronic devices (e.g., recipient electronic devices 314a-n). Accordingly, in some embodiments the electronic device 300 is able to communicate with the recipient electronic devices 314a-n via a network, while in other embodiments the electronic device 300 is not able to communicate with the recipient electronic devices 314a-n via a network. Instead, the electronic device 300 may communicate with the recipient electronic devices 314a-n via interfacing signals as discussed above. Examples of recipient electronic devices 314a-n include mobile phones, tablet computers, personal computers, wearable devices, and the like. Meanwhile, the electronic device 300 could be a mobile phone, tablet computer, personal computer, wearable device, payment system, advertising system, and the like. As an example, the electronic device 300 could be a payment system while the recipient electronic devices 314a-n may be mobiles phones associated with respective users who complete payment transactions using the payment system.

In embodiments where the communication module 308 is able to facilitate communications with destinations external to the electronic device 300 (e.g., the recipient electronic devices 314-an), the communication module 308 may be wireless communication circuitry designed to establish communication channels with the destinations. Examples of wireless communication circuitry include chips configured for Bluetooth, Wi-Fi, Near-Field Communication (NFC), and the like.

For convenience, the manipulation platform 310 may be referred to as a computer program that resides in the memory 304. However, the manipulation platform 310 could be comprised of software, firmware, or hardware implemented in, or accessible to, the electronic device 300. In accordance with embodiments described herein, the manipulation platform 310 may include various algorithms as discussed above with reference to FIGS. 1-2. Normally, these algorithms are executed by separate modules of the manipulation platform 310 that are separately addressable (and thus can execute independently without disturbing the other modules). These modules can be an integral part of the manipulation platform 310. Alternatively, these modules can be logically separate from the manipulation platform 310 but operate "alongside" it. Together, these algorithms may enable the manipulation platform 310 to modify an interfacing signal so as to transfer information to a destination.

Assume, for example, that a person completes a payment transaction on the electronic device 300 that serves as a payment system. Traditionally, when payment transactions are completed on sophisticated payment systems, digital receipts are provided in the form of text messages, email messages, or push notifications, and the underlying information is transmitted away from these sophisticated payment systems via a network. However, some payment systems are not able to connect to networks like the Internet. The approach described herein allows these payment systems to transfer information (e.g., digital receipts) to nearby recipient electronic devices through modification of audible or visual signals. In addition to allowing less sophisticated payment systems to quickly transfer information with little consumption of computational resources, the approach is also secure. Accordingly, the approach could be employed by electronic devices even if those electronic devices are able to connect to networks like the Internet. As an example, the manipulation platform 310 may transfer information (e.g., digital receipts) to nearby recipient electronic through modification of audible or visual signals instead of, or in addition to, transferring the information via a network.

Other elements could also be included as part of the manipulation platform 310. The nature of these other elements may depend on the intended application of the electronic device 300 and manipulation platform 310. For example, a UI module may be responsible for generating the content to be output by the UI output mechanism 306 for presentation to one or more recipient electronic devices 314a-n. Generally, the content output by the UI output mechanism 306 is tailored for each user or each recipient electronic device. Thus, the UI output mechanism 306 may output a first interfacing signal for detection by recipient electronic device 314a, a second interfacing signal for detection by recipient electronic device 314b, etc.

The form of the content may depend on the nature of the UI output mechanism 306. For example, if the UI output mechanism 306 is a speaker, then the content of the interfacing signal may pertain to an audible confirmation of an event (e.g., completion of a payment transaction), audible description of an item (e.g., a good or service), etc. As another example, if the UI output mechanism 306 is a display panel, then the content of the interfacing signal may pertain to a visual confirmation of an event (e.g., completion of a payment transaction), visual description of an item (e.g., a good or service), etc. As further discussed below, the UI output mechanism 306 may also be responsible for outputting (e.g., emitting or displaying) the interfacing signal onto which another signal has been superimposed, so as to audibly or visually modify the interfacing signal.

In operation, the manipulation platform 310—in combination with the other components of the electronic device 300—may be representative of a system that is able to analyze the audible or visual content of an interfacing signal to embed a relevant data packet (e.g., a link or offer) at a moment of relevance to the underlying content of the interfacing signal. In some embodiments, the manipulation platform 310 operates in near real time, so as to enable its use on live media content. Examples of live media content include radio shows, live television programs, live-streamed events, and the like.

By way of example, an extraction algorithm may be designed or trained to recognize potential spoken features (also called "sound tags") in speech—like references to brands, products, or attributes of brands or products—and then assign labels to audio to indicate the sound tags. Accordingly, different portions of audio content may be "tagged" or "labelled" to indicate its content. When relevant sound tags are detected by a detection algorithm, information regarding each sound tag can be transferred to one or more recipient electronic devices located nearby. For example, if the detection algorithm discovers a sound tag that is associated with a given product, then the manipulation platform 310 (and, more specifically, its modification algorithm and superimposition algorithm) may transmit a link to a website associated with the given product to the one or more recipient electronic devices.

Alternatively, the audible or visual content of the interfacing signal could be "pre-analyzed" in a static mode. In this scenario, the manipulation platform 310 can examine the interfacing signal in a similar manner, though this examination is not performed at runtime (e.g., while the interfacing signal is output for detection by one or more recipient electronic devices 314a-n), One advantage of "pre-analyzing" the interfacing signal is that less computational resources are necessary for labelling with sound tags since timeliness is less of a concern. Another advantage of "pre-analyzing" the interfacing signal is that a more robust detection algorithm could be used that cannot be implemented in near real time without delay. Similarly, "pre-analyzing" the interfacing signal may allow the manipulation platform 202 to perform multi-stage analysis (e.g., with one detection algorithm that identifies sound tags quickly but relatively low accurately and another detection that identifies sound tags slowly but with relatively high accuracy).

As further discussed below, the manipulation platform 310 could be programmed to design and then output visual modifications in addition to, or instead of, audible modifications. For example, the manipulation platform 310 may be able to design and then output visual modifications that are optimized for detection by an mmWave radar system. Visual modifications can be designed such that those modifications cause large state changes to a video output component (e.g., a display panel) without being noticeable to the human eye. One example of a suitable visual modification is a flicker pattern, where adjacent rows or columns of the display panel are cycled between different color states and the information is encoded via a suitable frequency modulation scheme. While the visual modification may be readily detectable by a recipient electronic device—though not necessarily through visual detection (e.g., where detection is by a mmWave radar system)—visibility by the corresponding user may be minimized by selecting a carrier frequency above the flicker fusion frequency for human vision. Alternatively, the visual modification may be noticeable to the user but may only affect a portion of the interfacing signal. For example, the visual modification may overlay a less critical part of a video signal, such as an upper or lower corner. Thus, the modification may only affect a portion of each frame included in the section of the interfacing signal over which the signal is superimposed.

As part of the information transfer process, the manipulation platform 310 may identify one or more characteristics of the electronic device 300. Examples of characteristics include display size, display type (e.g., LCD, OLED, etc.), model, desired detection distance from recipient electronic devices, intended application of the approach described herein, nearby sources of noise (e.g., radio frequency noise), and the like. Based on these characteristics, the manipulation platform 310 can identify a modulation scheme. The modulation scheme may govern how information is transferred to recipient electronic devices. The modulation scheme may specify the nature of the signal that is to be superimposed on the interfacing signal. For example, the modulation scheme may specify characteristics of the signal such as whether the signal is an audio signal or video signal, whether the signal is ultrasonic, whether the video signal is intended to be detectable by a certain sensor (e.g., a mmWave radar system), etc. While each information transfer may be performed in accordance with the modulation scheme, the modulation scheme need not necessarily impose the same constraints (e.g., in terms of packet size) on each recipient electronic device.

As mentioned above, the electronic device 300 could be tasked with communicating information to more than one recipient electronic device 314a-n, either simultaneously or sequentially. Since the information transfer involves an audible or visual signal, the same information may be transferred to each recipient electronic device that "listens" or "views" the interfacing signal at the same time. In order to transfer different information to each recipient electronic device, the recipient electronic devices 314a-n may disambiguate the transmissions via timing, content, and other features. Assume, for example, that the electronic device 300 serves as a payment system with which different individuals complete payment transactions. Digital receipts for those payment transactions could be indiscriminately broadcast by the electronic device 300. In such a scenario, the recipient electronic devices 314a-n may "hear" many of these transmissions. For each transmission that is "heard," each recipient electronic device may search a computer program (e.g., a payment application) executing on that recipient electronic device to find a transaction where the information matches one of the transmissions. This allows that recipient electronic device to associate the received data (e.g., the purchased items and associated costs) with the corresponding user and provide a digital receipt. The remaining transmissions could be ignored or deleted once received as being irrelevant. Transmissions could be distinguished based on timing in some embodiments. For example, the recipient electronic device may only "search" for transmissions for a certain interval of time after determining, based on information available from the computer program (e.g., the payment application), that a transaction has been completed.

Receipt and subsequent decoding of the interfacing signal by a recipient electronic device could permit various functionalities. For example, certain UI features may be made accessible on the recipient electronic device for interaction for a certain amount of time (e.g., so long as the superimposed signal is detectable in the interfacing signal). In this way, the superimposed signal can act as a beacon that permits contextualized data to be provided based on location. As another example, certain UI features may be enabled on the recipient electronic device based on its movement during the period of information transfer. For example, the UI may take the form of physical motion on the recipient electronic device relative to the electronic device 300, such that the interfacing signal on which another signal is superimposed is altered due to its directionality and strength. Certain motions may be associated with UI functions, such as accepting or declining a proposed course of action (e.g., to transfer information, complete a payment transaction, etc.).

Methodologies for Signal Manipulation

Figure 4:
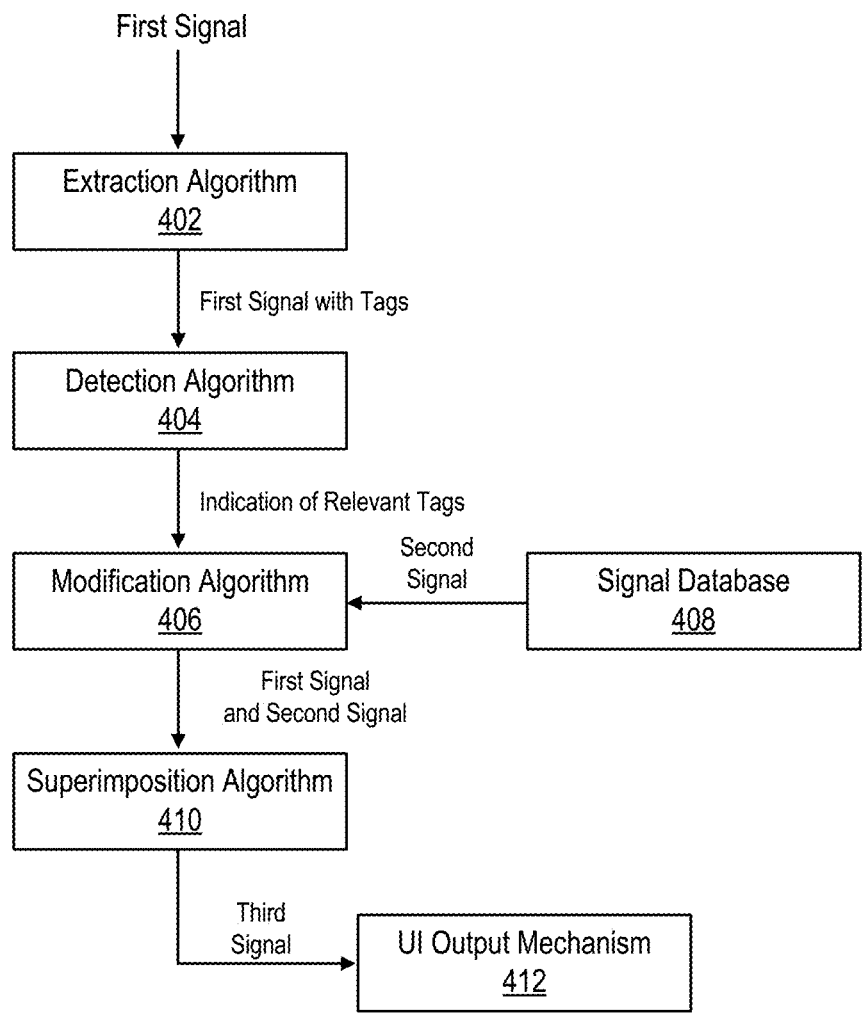
FIG. 4 includes a schematic diagram of a procedure for transferring information from a first electronic device (also called a "source electronic device") to a second electronic device (also called a "recipient electronic device") through modification of an audible or visual signal.

FIG. 4 includes a schematic diagram of a procedure 400 for transferring information from a first electronic device (also called a "source electronic device") to a second electronic device (also called a "recipient electronic device") through modification of an audible or visual signal. This audible or visual signal may be referred to as an "interfacing signal" or "first signal" that is detectably by a user of the source electronic device. As mentioned above, the user may be associated with the recipient electronic device.

In some embodiments, the first signal is detectable by the recipient electronic device. For example, if the first signal includes human-hearable audio content, then the recipient electronic device may be able to detect the first signal using an audio input component. The first signal does not necessarily need to be detected by the recipient electronic device, however. Assume, for example, that a payment system is to transfer data comprising information related to a payment transaction to the mobile phone of a customer. In such a scenario, the payment system is representative of the source electronic device, while the mobile phone is representative of the recipient electronic device. The first signal may be the human-readable video content shown by the payment system. To transfer data (e.g., specifying the items purchased and associated costs) to the mobile phone, a signal manipulation platform executing on the payment system can modulate the first signal such that the modulations are detectable by a sensor included in the mobile phone, even though the mobile phone may not be visually observing the payment system at present. For example, modulations of the human-readable video content may be detectable by an mmWave radar system included in the mobile phone. This example also illustrates that the user of the source electronic device (e.g., a cashier) need not be the same person as the user of the recipient electronic device (e.g., a customer).

Initially, a manipulation platform can obtain the first signal. In some embodiments, the first signal is obtained in near real time (e.g., in conjunction with output by a UI output mechanism 412). In other embodiments, the first signal is "pre-examined" prior to being output by the UI output mechanism 412 as discussed above. The manipulation platform can then provide the first signal to an extraction algorithm 402, as input, so as to obtain a series of tags. If the first signal is representative of an audio signal, then these tags may be representative of "sound tags." If the first signal is representative of a video signal, then these tags may be representative of "video tags." Regardless of its nature, these tags may be representative of labels that indicate the content of the first signal.

Then, the manipulation platform can provide the first signal and accompanying tags to a detection algorithm 404. When relevant tags are detected by the detection algorithm 404, information regarding those tags can be transferred to a nearby recipient electronic device. Thus, the detection algorithm 404 may parse the tags generated by the extraction algorithm 402, so as to identify appropriate opportunities to transfer information to the recipient electronic device. As output, the detection algorithm 404 may produce an indication of relevant tags. For example, the detection algorithm 404 may maintain an ordered list of tags that are representative of, or associated with, products of interest for advertising purposes.

The indication of relevant tags can be provided, as input, to a modification algorithm 406 by the manipulation platform. As discussed above, the modification algorithm 406 may be responsible for determining, based on the relevant tags detected by the detection algorithm 404, information to be transferred to the recipient electronic device. This information may be represented as a second signal. In some embodiments, the second signal is retrieved by the modification algorithm 406 from a signal database 408 as shown in FIG. 4. Alternatively, the modification algorithm 406 could generate the second signal based on the tags deemed relevant by the detection algorithm 404.

Thereafter, the manipulation platform can provide the first signal and second signal to a superimposition algorithm 410 as input. As discussed above, the superimposition algorithm 410 may be able to superimpose the second signal on the first signal, so as to generate a third signal that can be output, via the UI output mechanism 412, for detection by the recipient electronic device. At a high level, this third signal may be representative of the second signal in combination with the first signal. Generally, the second signal is only superimposed on a portion of the first signal. For example, if the first signal is representative of an audio signal corresponding to recorded or streamed audio content, the second signal may only be superimposed on several seconds' worth of the audio signal. As another example, if the first signal is representative of a video signal corresponding to recorded or streamed video content, the second signal may only be superimposed on several seconds' worth of the video signal. Accordingly, the UI output mechanism 412 only output the third signal for a limited amount of time (e.g., several seconds or minutes), and the first signal may be output before and after the limited amount of time.

Figure 5:
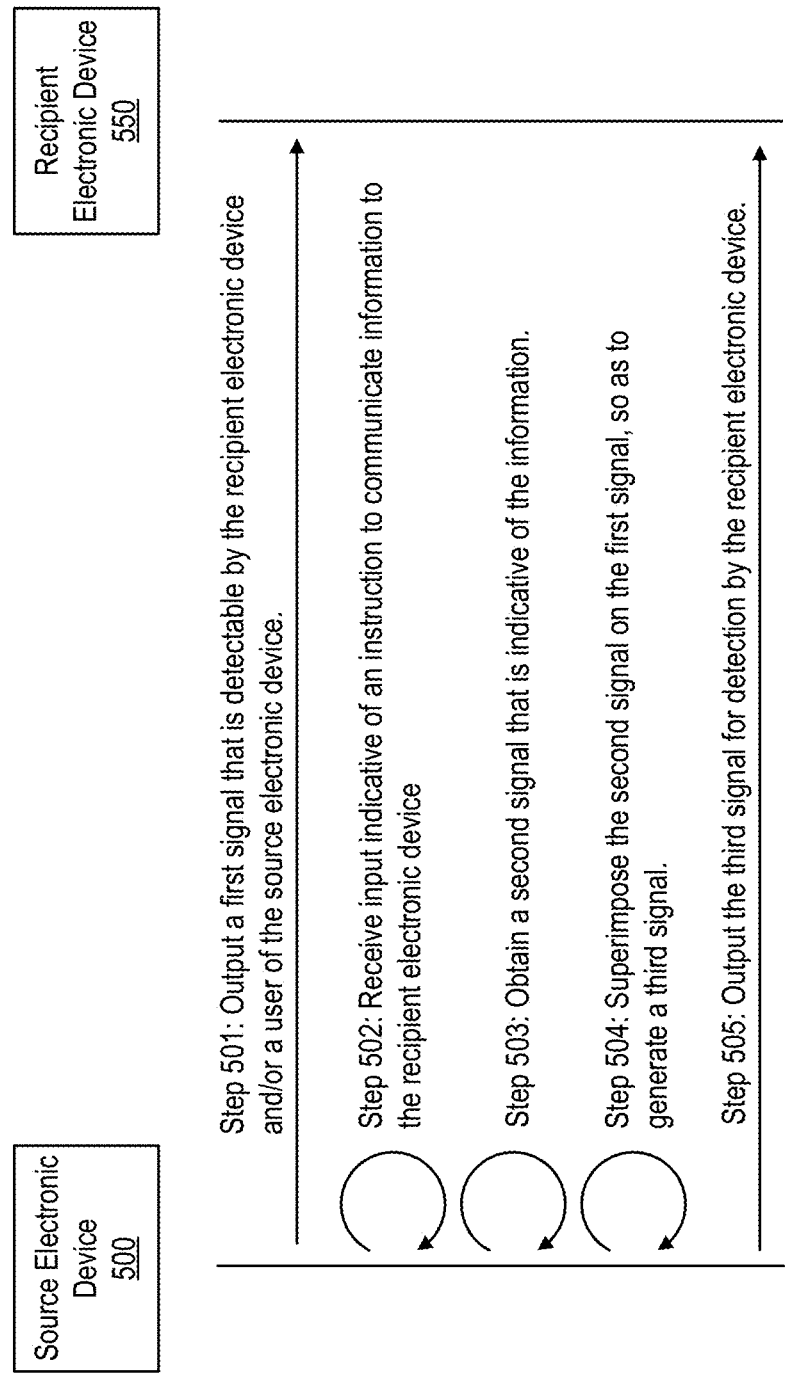
FIG. 5 includes a high-level illustration of communications between a source electronic device and a recipient electronic device.

FIG. 5 includes a high-level illustration of communications between a source electronic device 500 and a recipient electronic device 550. The source electronic device 500 could be electronic device 204 of FIG. 2 or electronic device 300 of FIG. 3. Initially, the source electronic device 500 can output a first signal that is (i) detectable by the recipient electronic device 550 and/or (ii) detectable by a user of the source electronic device 500 (step 501). As mentioned above, the user of the source electronic device 500 could be associated with the recipient electronic device 550, or the user of the course electronic device 500 could be unrelated to the recipient electronic device 550. In some embodiments, the first signal is representative of an audio signal that is emitted by an audio output component of the source electronic device 500. In other embodiments, the first signal is representative of a video signal that is displayed by a video output component of the source electronic device 500.

Thereafter, the source electronic device 500 may receive input indicative of an instruction to communicate information to the recipient electronic device 550 (step 502). Generally, this input is generated or detected by a detection algorithm as discussed above with reference to FIGS. 1 and 4. When the context of the first signal output by the source electronic device 500 is determined to match any of a number of predetermines classes (also called "context categories"), the detection algorithm may indicate to the signal manipulation platform to begin a transmission. As an example, if the source electronic device 500 is a payment system, one context category that indicates transfer should occur may be reaching a checkout screen. As another example, if the source electronic device 500 is an advertisement system, one context category that indicates transfer should occur may be the display of content discussing a brand, product, or merchant for which an offer is available. The input could also be representative of a discovery of a tag of interest as discussed above. For example, the input may be representative of a determination that a sound tag associated with a brand, product, or merchant of interest has been detected. Alternatively, the source electronic device 500 may receive a communication from the recipient electronic device 550 that the information is desired. For example, the recipient electronic device 550 may "ping" the source electronic device 500 in response to a determination (e.g., based on analysis of the first signal, input provided by the user, etc.) that information from the source electronic device 500 is desired.

The source electronic device 500 can obtain a second signal that is indicative of the information (step 503) and then superimpose the second signal on the first signal, so as to generate a third signal (step 504). As discussed above, the second signal is normally superimposed on a portion of the first signal. As such, the source electronic device 500 may output the first signal as discussed above with reference to step 501, output the third signal for detection by the recipient electronic device (step 505), and then output the first signal once again when the second signal is no longer superimposed thereon.

How the second signal is superimposed onto the first signal may depend the nature of the first signal, as well as characteristics of the source electronic device 500 or recipient electronic device 550.

In embodiments where the first signal is representative of an audio signal, the second signal could be representative of an ultrasonic signal that is audible to the recipient electronic device 550 but not its user. In such a scenario, the second signal can be superimposed onto the first signal by encoding the second signal in a section of the first signal that is specified by, or determined based on, the input. For example, superposition may be performed such that the second signal (e.g., representative of a digital receipt) is encoded in the first signal (e.g., representative of a UI through which a payment transaction was completed) in a time-aware manner so that the information encoded in the second signal is provided to the appropriate person.

In embodiments where the first signal is representative of a video signal, superimposition may include encoding the first and second signals into a form such that the encoded second signal is detectable by a sensor included in the recipient electronic device 550. The sensor could be, for example, a mmWave radar system that is designed for electromagnetic waves above 24 GHz.

As discussed above, the second signal may only be superimposed on the first signal for an interval of time. The manipulation platform may identify an interval of time over which to superimpose the second signal on the first signal based on an analysis of content of the first signal. Then, the manipulation platform can combine the first and second signals, such that the second signal-representing the information to be transferred—coincides with the interval of time.

In sum, the source electronic device 500 can output a first signal that is audibly or visually detectable by the recipient electronic device 550 and/or a user of the source electronic device 500; receive input indicative of an instruction to communicate information to the recipient electronic device 550; superimpose a second signal that is indicative of the information on the first signal, so as to generate a third signal; and output the third signal for detection by the recipient electronic device 550.

As mentioned above, the source electronic device 500 may communicate with more than one recipient electronic device in some scenarios. Accordingly, aspects of the procedure 500 could be performed simultaneously or sequentially by the source electronic device 500, so as to communicate with each of these recipient electronic devices. For example, steps 502-505 may be performed in succession to transfer information to each of these recipient electronic devices. Note that the information being transferred to each of these recipient electronic devices does not need to be the same. As such, the second signal that is superimposed on the first signal could be different for each of the recipient electronic devices.

FIG. 6 includes a flow diagram of a process 600 performed by a source electronic device to transfer information to a recipient electronic device. Initially, the source electronic device can output a first stream of encoded data that is audibly or visually detectable by a user (step 601). Then, the source electronic device can determine that information accessible to it is to be shared with a recipient electronic device (step 602). For example, the source electronic device may establish that information should be shared with the recipient electronic device in response to a determination that an event (e.g., completion of a payment transaction, mention of a product, etc.) occurred involving the user or the recipient electronic device. As a specific example, the source electronic device could implement a machine learning (ML) algorithm that is trained to detect utterances of brand names, product names, or person names that are included on a predetermined list. This detection algorithm may produce, as output, an indication that one of the brand names, product names, or person names was uttered or shown in the first stream of encoded data. In such embodiments, the source electronic device may determine that information regarding a given brand, product, or person should be transferred to the recipient electronic device in response to a determination, by the detection algorithm, that the given brand, product, or person was uttered or shown in the first stream of encoded data.

The source electronic device can then generate or retrieve a second stream of encoded data that is indicative of the information to be shared (step 603). Assume, for example, that the information to be shared is related to a payment transaction that is completed using the source electronic device. In this scenario, information relevant to the payment transaction can be extracted by a signal manipulation platform, for example, by taking direct numerical values from a processor of the source electronic device, encoding according to a suitable encoding scheme, and then overlaying the calculated modifications on the first stream of encoded data that is representative of the original interfacing signal. Further information regarding the encoding scheme can be found below. Note, however, that it is generally not crucial which encoding scheme is used, so long as the recipient electronic device "knows" what to look for.

The information can then be transferred, by the source electronic device to the recipient electronic device, by combining the second stream of encoded data with the first stream of encoded data, so as to create a third stream of encoded data (step 604). More specifically, the source electronic device can superimpose the second stream of encoded data onto a portion of the first stream of encoded data. This third stream of encoded data can then be output for detection by the recipient electronic device (step 605).

From the perspective of the recipient electronic device, the presence or likely presence of a broadcast may be directly detected or indirectly inferred based on its current location, its current use, or input provided by its user. For example, the recipient electronic device may initiate an audio input component in response to a determination that it is located within a predetermined proximity of a given location. One example of an audio input component is a microphone. As another example, the recipient electronic device may initiate a video input component in response to receiving input indicative of a request, from its user, to do so. One example of a video input component is an image sensor that is capable of generating image data, for example, in the form of digital images. The image sensor may be part of the camera module (or simply "camera") of the recipient electronic device.

Generally, the encoding and decoding schemes used by the source electronic device and recipient electronic device, respectively, are specific to the implementation, and therefore are not discussed at length. However, to give an example, the Institute of Electrical and Electronics Engineers (IEEE) 802.15 series of standards define schemes for encoding, decoding, modulation, media access, physical layer, and the like for personal area networks. One of these standards may be used to implement the mmWave and OCC embodiments discussed above. For the embodiment that relies on acoustic data transmission, one protocol that could be used is Beeping, a communication protocol that was designed to transmit data between electronic devices over ultrasound. A proprietary standards could also be developed to implement these embodiments.

FIGS. 7A-D include schematic diagrams that illustrate how an extraction algorithm, detection algorithm, modification algorithm, and superimposition algorithm can work in concert to implement the approaches described herein. These algorithms may be comparable to the extraction algorithm 402, detection algorithm 404, modification algorithm 406, and superimposition algorithm 410 of FIG. 4. Each of these algorithms is discussed in greater detail below.

Figure 7A:
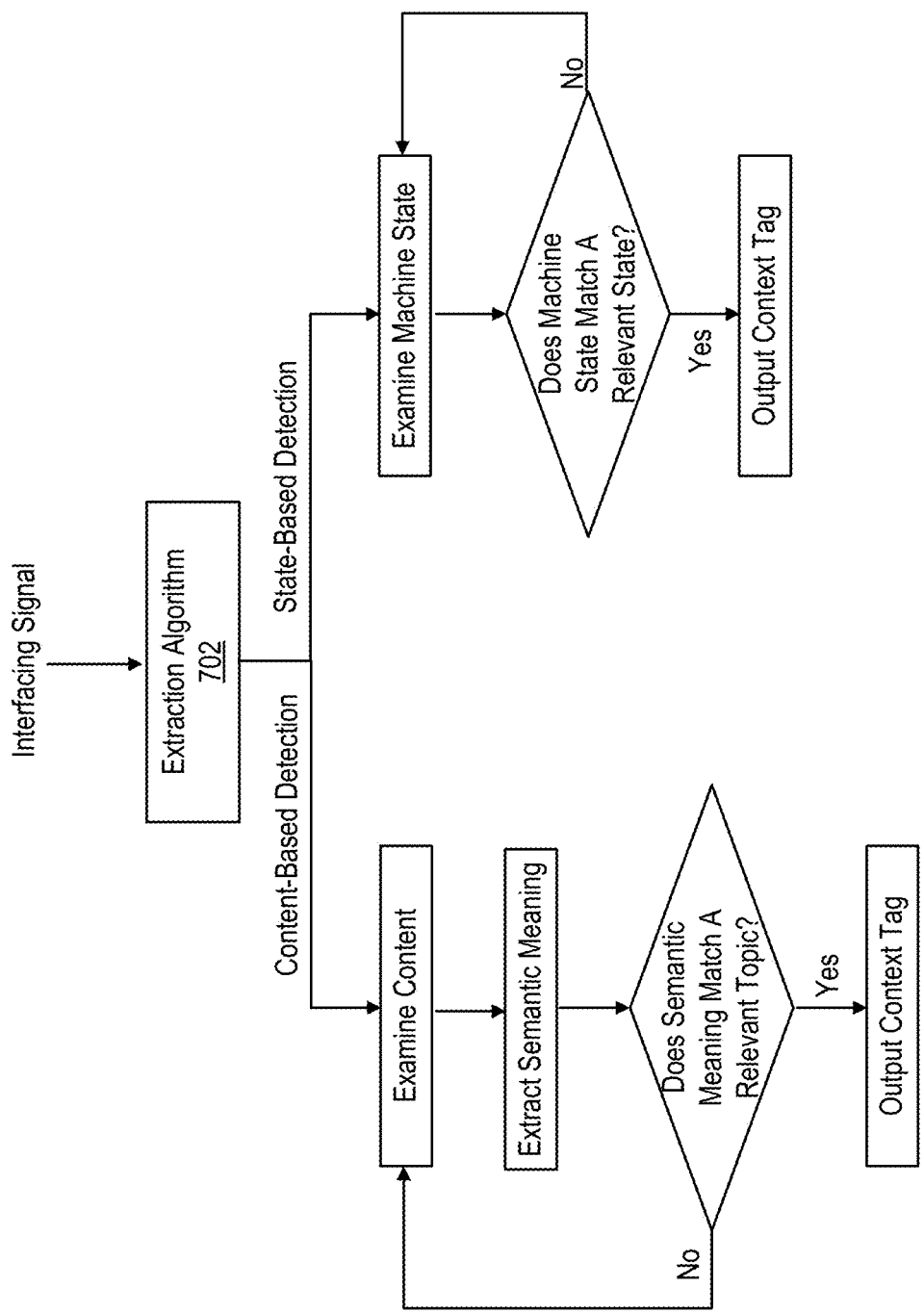
FIG. 7A includes a schematic diagram that illustrates how an extraction algorithm can process an interfacing signal, so as to identify appropriate opportunities to transfer information to a recipient electronic device.

FIG. 7A includes a schematic diagram that illustrates how an extraction algorithm 702 can process an interfacing signal, so as to identify appropriate opportunities to transfer information to a recipient electronic device. The interfacing signal can initially be provided to the extraction algorithm 702 as input. As shown in FIG. 7A, the extraction algorithm 702 may be able to detect context via several different approaches.

In one approach (also called "content-based detection"), the extraction algorithm 702 can examine the content (e.g., spoken audio or displayed video) of the interfacing signal, extracts semantic meaning (e.g., meaning of numbers, letters, words, and phrases) from the content, and then determines whether the semantic meaning matches a relevant topic for data transfer. Semantic meaning may be extracted using machine learning approaches. Meanwhile, the relevant topics may be determined, for example, through a comparison of the semantic meaning to a list of brands, products, merchants, and the like. If the semantic meaning matches a relevant topic, then the extraction algorithm 702 may output a context tag that is representative of the underlying content. For example, the context tag may indicate the salient numbers, letters, words, or phrases from which the semantic meaning was extracted. If the semantic meaning does not match a relevant topic, then the extraction algorithm 702 can continue to examine the content of the interfacing signal.

In other approach (also called "state-based detection"), the extraction algorithm 702 can extract the machine state and then determine whether the machine state matches a relevant state for data transfer. One example of a relevant state is reaching a given interface (e.g., a checkout interface). Another example of a relevant state is interacting with the source electronic device for at least a predetermined amount of time. If the machine state matches the relevant state, then the extraction algorithm 702 may output a context tag that is representative of the machine state. For example, the context tag may include, or allude to, information regarding the machine state. If the machine state does not match the relevant state, then the extraction algorithm can continue to examine the machine state.

Figure 7B:
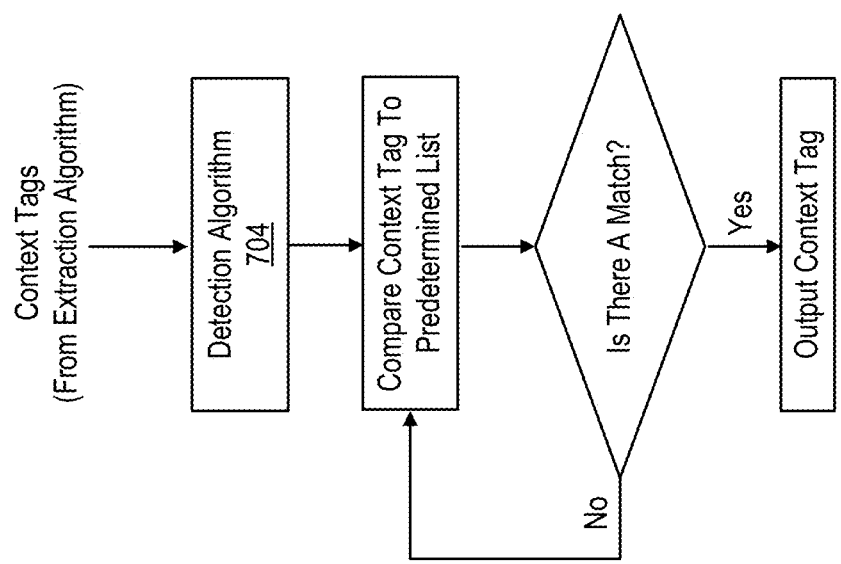
FIG. 7B includes a schematic diagram that illustrates how a detection algorithm can examine the output produced by the extraction algorithm, so as to determine whether it is appropriate to initiate a transfer of information from a source electronic device to a recipient electronic device.

FIG. 7B includes a schematic diagram that illustrates how a detection algorithm 704 can examine the output produced by the extraction algorithm 702, so as to determine whether it is appropriate to initiate a transfer of information from a source electronic device to a recipient electronic device. Context tags produced by the extraction algorithm 702 as output can initially be provided to the detection algorithm 704 as input. The detection algorithm 704 can then examine the context tags. For example, the detection algorithm 704 may compare each context tag to a predetermined list of context tags to determine whether there is a match. The predetermined list may include those context tags for which relevant information—like advertisements, promotional offers, and the like—is currently available. If the context tag matches an entry in the predetermined list, then the detection algorithm 704 may output the matching context tag. By outputting the matching context tag, the detection algorithm 704 can initiate the data transfer process as further discussed below. Conversely, if the context tag does not match any entries in the predetermined list, then the detection algorithm 704 may discard the context tag and begin the matching process with a new context tag.

Figure 7C:
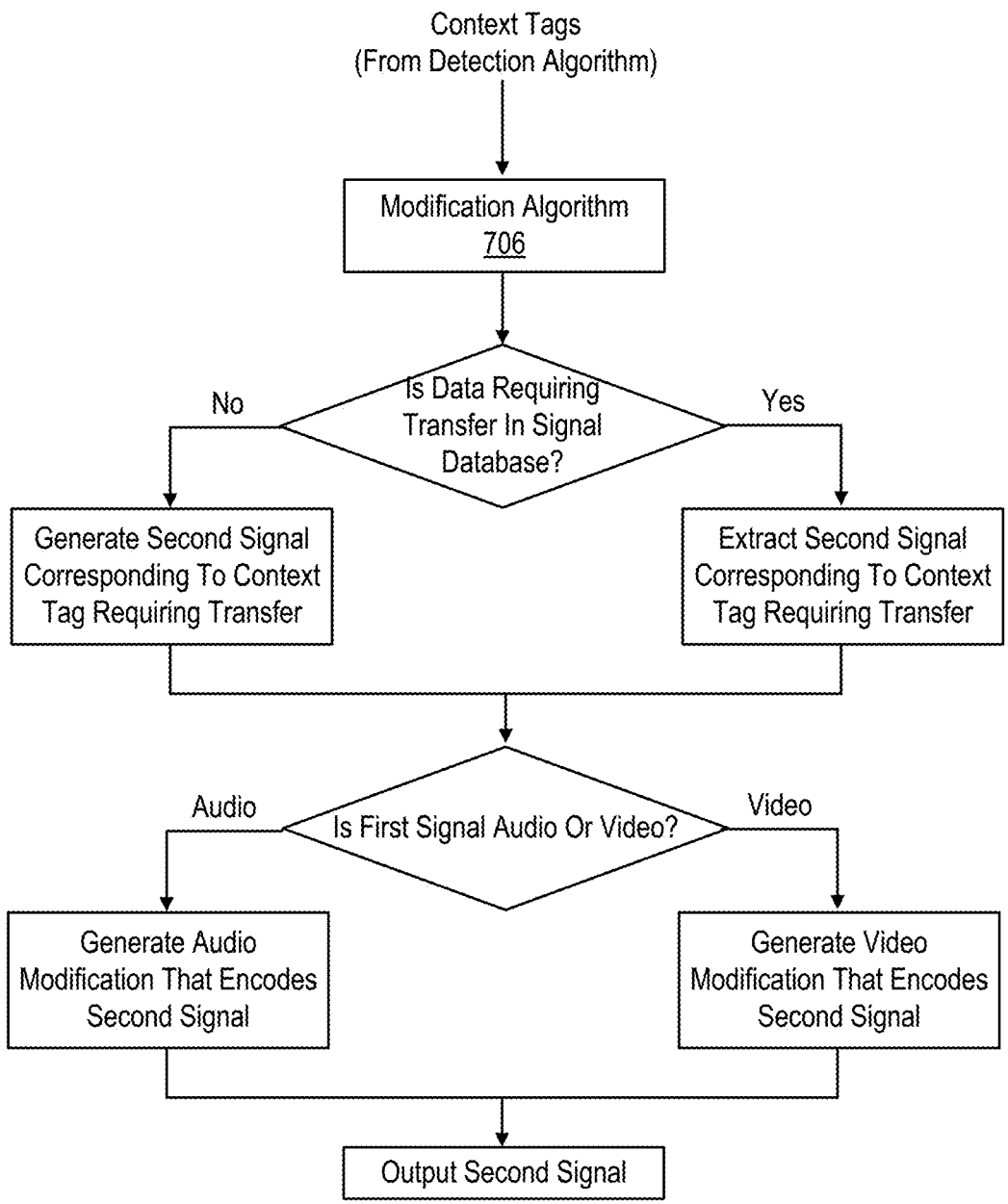
FIG. 7C includes a schematic diagram that illustrates how a modification algorithm can modify an interfacing signal, so as to overlay relevant information thereon.

FIG. 7C includes a schematic diagram that illustrates how a modification algorithm 706 can modify an interfacing signal, so as to overlay relevant information thereon. For the purpose of illustration, the interfacing signal may be described as a "first signal." Context tags produced by the detection algorithm 704 as output can initially be provided to the modification algorithm 706 as input. For each context tag, the modification algorithm 706 can determine whether a second signal that is representative of the data to be transferred for that context tag is located in a signal database. Each signal included in the signal database may be representative of one or more data packets that convey information regarding a corresponding context tag. The signal database could be signal database 216 of FIG. 2, signal database 312 of FIG. 3, or signal database 408 of FIG. 4. If the second signal is located in the signal database, then the modification algorithm 706 can acquire or extract the second signal from the signal database. However, if the second signal is not located in the signal database, then the modification algorithm 706 may generate the second signal that is representative of the data to be transferred.

Then, the modification algorithm 706 can ascertain the nature of the first signal. For example, the modification algorithm 706 may establish, based on an analysis of its content, metadata, or format, whether the first signal is an audio signal or a video signal. If the first signal is an audio signal, then the modification algorithm 706 can generate an appropriate audio modification that encodes the contents of the second signal corresponding to the context tag. Audio modifications may be generated based on acoustic data transmission scheme as discussed above. If the first signal is a video signal, then the modification algorithm 706 can generate an appropriate video modification that encodes the contents of the second signal corresponding to the context tag. Video modifications may be generated in accordance with an existing modulation scheme (e.g., IEEE 802.15) or a proprietary modulation scheme. In some embodiments, these video modifications are transposed to the mmWave domain by the modification algorithm 706, such that these video modifications are detectable by mmWave radar systems. As output, the modification algorithm can produce the second signal that includes data to be transferred, which is modulated in accordance with a suitable modulation scheme.

Figure 7D:
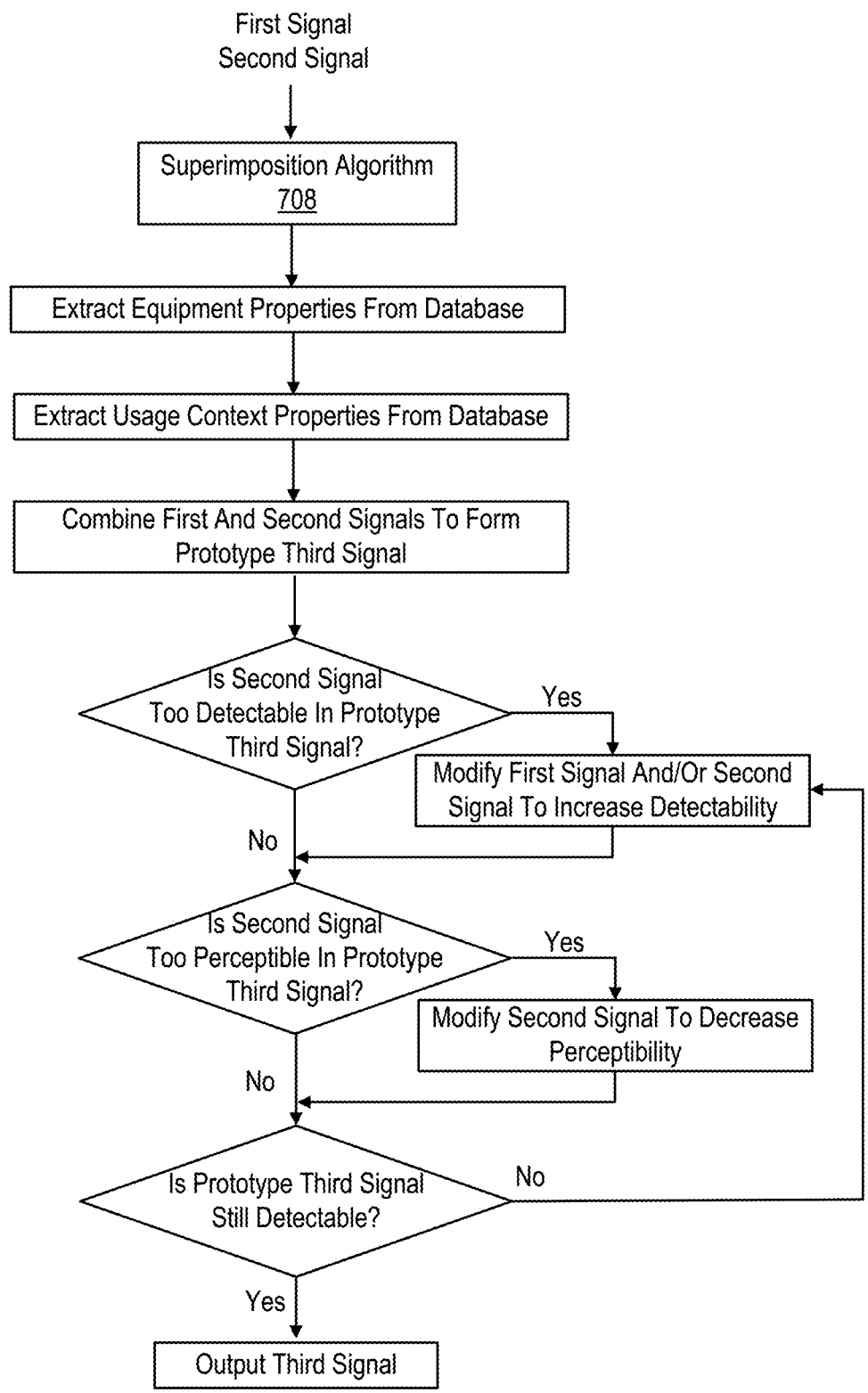
FIG. 7D includes a schematic diagram that illustrates how a superimposition algorithm can superimpose a second signal output by the modification algorithm on the first signal to be broadcast by the source electronic device.

FIG. 7D includes a schematic diagram that illustrates how a superimposition algorithm 708 can superimpose a second signal output by the modification algorithm 706 on the first signal to be broadcast by the source electronic device. As input, the superimposition algorithm 708 can take (i) the first signal to be broadcast by the source electronic device and (ii) the second signal that includes information to be conveyed to a recipient electronic device. As discussed above with reference to FIG. 7C, the second signal may be modulated in accordance with a suitable modulation scheme based on the nature of the first signal.

Initially, the superimposition algorithm 708 can extract equipment properties from a database. These equipment properties may relate to the source electronic device, recipient electronic device, or both electronic devices. By examining the equipment properties, the superimposition algorithm 708 may be able to determine or infer whether the recipient electronic device is able to detect audio signals or video signals broadcasted by the source electronic device. Moreover, the superimposition algorithm 708 may extract usage context properties from the database. Examples of usage context properties include the typical distance between the source electronic device and recipient electronic devices, the typical duration of time spent by recipient electronic devices in proximity to the source electronic device, etc. In some embodiments the database is maintained on the source electronic device, while in other embodiments the database is maintained on another electronic device (e.g., a computer server) to which the source electronic device is communicatively connected.

The superimposition algorithm 708 can then combine the first and second signals to form a third signal. In some embodiments, this third signal is further manipulated, and therefore many be referred to as a "prototype third signal." After forming the prototype third signal, the superimposition algorithm 708 may estimate the detectability of the second signal based on the equipment properties and usage context properties extracted from the database. Detectability may depend on (i) parameters of the source electronic device, such as display size and audio volume, (ii) parameters of the recipient electronic device, and (iii) environmental factors, such as separation, background noise, etc. If the detectability of the second signal is determined to be low, then the superimposition algorithm may modify the first and second signals to increase detectability. Moreover, the superimposition algorithm 708 may determine, given the equipment properties and usage context properties, the degree to which the second signal will be sensorily perceptible within the prototype third signal. If the likelihood of being sensorily perceptible is determined to be high, then the superimposition algorithm 708 may modify the second signal to reduce noticeability. Noticeability of the second signal can be reduced, for example, by reducing the presence or magnitude of frequencies in the audible range, reducing contrast differences in visual content, or increasing the flicker rate above the visible range. As shown in FIG. 7D, the superimposition algorithm 708 can then determine whether the prototype third signal still meets the detectability requirement. If the prototype third signal still meets the detectability requirement, then the superimposition algorithm 708 can output the third signal in its finalized form, in preparation for broadcast by the source electronic device. This third signal not only contains data regarding the corresponding context tag, but can be presented alongside the first signal in such a manner that it is detectable by the recipient electronic device but minimally detectable—or not at all detectable—by a user of the source electronic device. If the prototype third signal does not meet the detectability requirement, then the superimposition algorithm 708 can continue the modification process as shown in FIG. 7D.

Exemplary Use Cases

Figure 8:
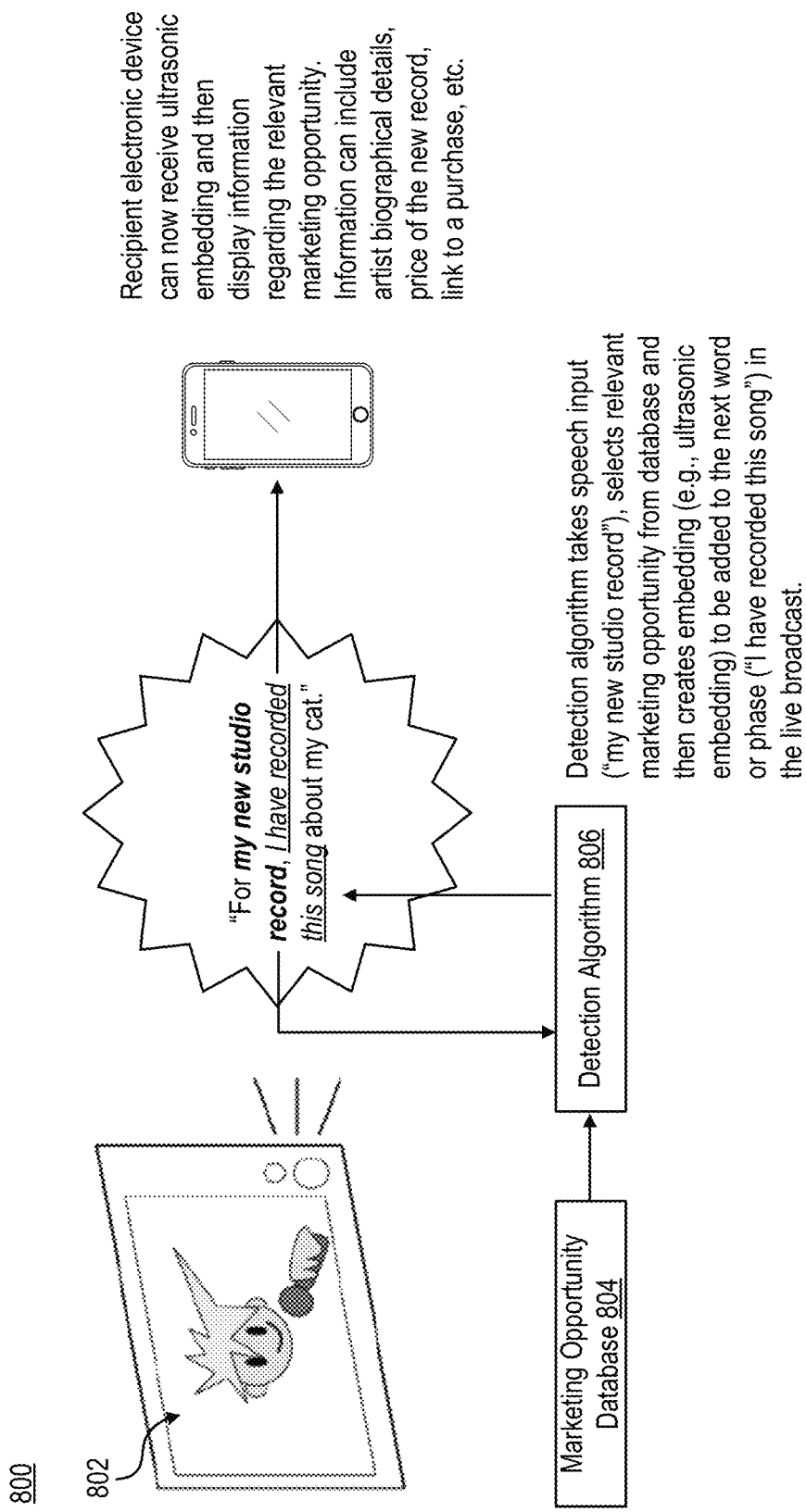
FIG. 8 illustrates how links can be intelligently embedded in audio signals based on an analysis of the speech included therein.
Figure 9:
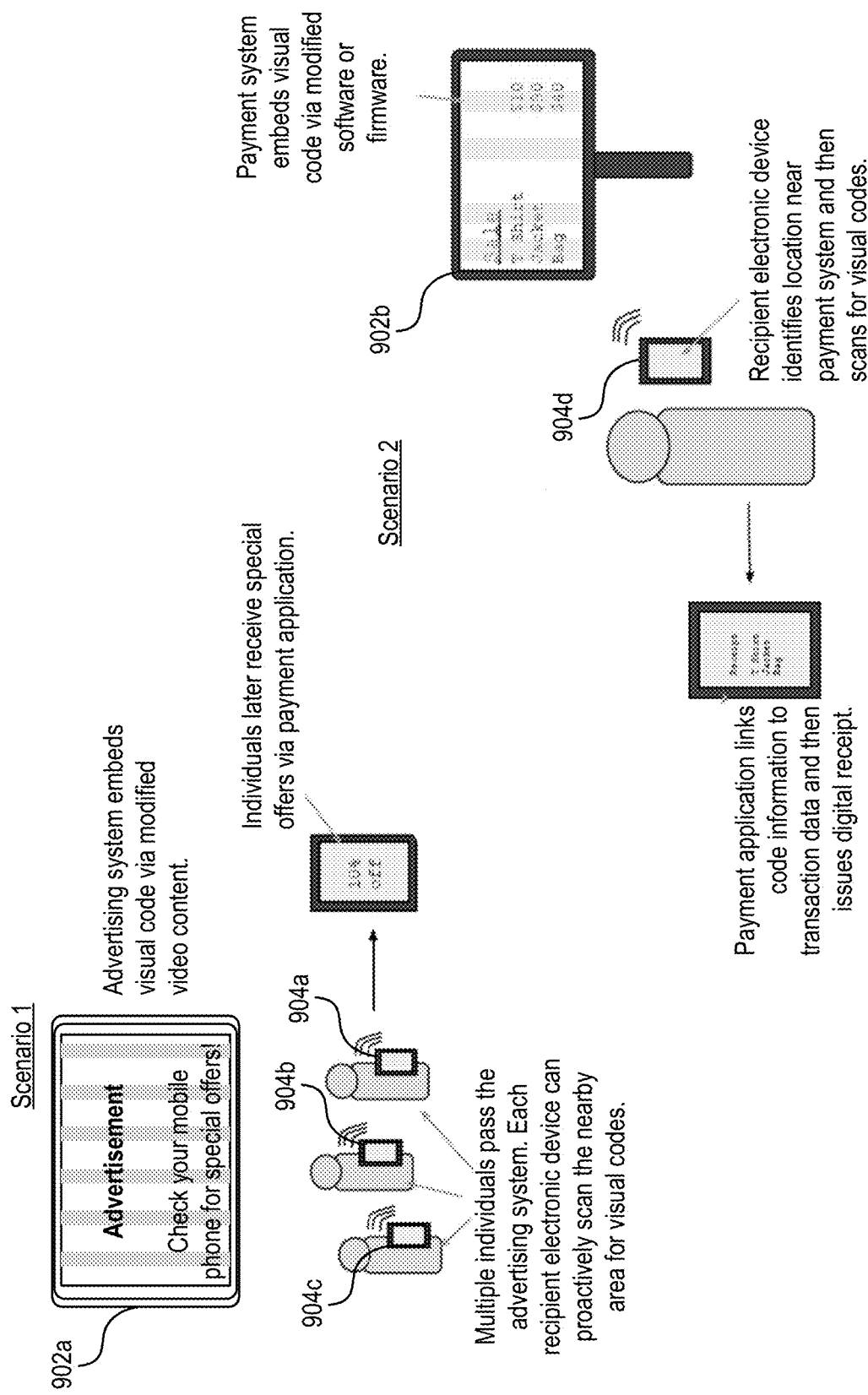
FIG. 9 illustrates how the approach described herein can be used to facilitate the secure transfer of sensitive information.

FIGS. 8-9 illustrate two different scenarios in which the approach described herein could be implemented to transfer relevant information to an individual (and, more specifically, her electronic device) through modification of an audible or visual signal.

FIG. 8 illustrates how links can be intelligently embedded in audio signals based on an analysis of the speech included therein. One possible implementation of the approach described herein involves the creation of audio embeddings within speech that act as a "payment link." Payment-related information can be embedded, possibly in real time, into the speech of the user by recognizing relevant words (e.g., "amount," "dollars," etc.) and phrases (e.g., "transaction complete," "payment accepted," etc.) and then broadcasting the payment-related information related to those "cures" as metadata for each relevant word. This enables advertisements to be generated in near real time into the speech of the individual, by recognizing words and phrases that constitute a marketing or advertising opportunity.

As shown in FIG. 8, the system 800 can include an interfacing signal (here, a live broadcast recording 802, a database 804 of information regarding marketing opportunities such as advertisements, and a detection algorithm 806. In this scenario, the detection algorithm 806 may be responsible for transcribing, establishing, or other understanding content of the live broadcast recording 802. As such, the detection algorithm 806 may be referred to as a "transcription algorithm." Then, the detection algorithm 806 may be determine whether any marketing opportunities included in a database are suitable or appropriate given the content of the live broadcast recording 802. Said another way, the detection algorithm 806 can determine whether the content is a "match" for any marketing opportunities included in the database. The match can be made based on, for example, properties or meanings of the words and phrases, user preferences, attributed of a potential audience, and the like. When there is a match, the appropriate information can be transferred to the broadcast system that is responsible for outputting the life broadcast recording 802.

Several additional example scenarios are provided below to help illustrate the malleability of the approach described herein. As one example scenario, assume that an influencer is presently involved in a live broadcast. In such a scenario, the system 800 can detect a product that the influencer is discussing. When a "target word" is detected by the system 800, the system 800 can superimpose an ultrasonic data packet with information regarding the product onto the next word or phrase. Whenever someone records the live broadcast, that person can obtain relevant payment details. Moreover, the influencer may receive compensation every time that the link is opened or the product is purchased via the link. As another example, in a podcast, the system 800 may superimpose various advertisements on words or phrases that match marketing opportunities in a category selected by the user. In a previously recorded podcast, updated marketing opportunities may be used to embed newer advertisements in the live broadcast.

FIG. 9 illustrates how the approach described herein can be used to facilitate the secure transfer of sensitive information. More specifically, FIG. 9 shows how information related to (e.g., necessary for) a payment transaction can be visually conveyed through modification of a visual signal. One interesting application of the approach described herein involves digital receipts. However, the approach described herein could also be used to facilitate payment beacon, special offers and promotions, advertisements, etc.

Assume, for example, that an individual has completed a payment transaction using a legacy system, such as an advertising system or payment system. This legacy system may seamlessly communicate data that is relevant to payments but not overly sensitive with a recipient electronic device. This can be accomplished by embedded visual codes on its display. These visual codes can be examined, parsed, or otherwise detected by a sensor (e.g., a mmWave radar system) housed in the recipient electronic device. The information that is received may be used by another computer program executing on the recipient electronic device to offer features such as digital receipts, product information, advertisements, and special offers.

These visual codes may be embedded onto the underlying video signal in the form of interlaced rows whose frequency encodes the data, but which may be too rapid to be noticed by a person who views content of the display. Overall, this approach places low requirements on legacy systems. As such, the approaches described herein could be achieved simply through a change in firmware or software governing display of content.

Note that the recipient electronic device may identify moments when these visual codes may be present (e.g., based on location) and then switch on its detection. In embodiments where detection is accomplished using mmWave radar systems, the user may not need to remove the recipient electronic device from her pocket, bag, etc. Instead, the mmWave radar system may be able to detect these visual codes through clothing. UI features could also be managed based on the visual codes that are present. For example, UI features may be enabled via the angular dependence of the code signal and alignment of the recipient electronic device with the source electronic device As shown in FIG. 9, a source electronic device 902a-b can initially display one or more digital images. Algorithms—implemented either internally or externally—can generate "flash codes" that carry information liked, for example, to the contents of those digital images. If a recipient electronic device 904a-d detects a situation where the flash codes may be present (e.g., based on user being located near the source electronic device) and then switches on its mmWave radar system. Alternatively, the recipient electronic device may proactively scan for nearby visual codes at a predetermined frequency. The data represented by the flash codes can be read by the recipient electronic device via the mmWave radar system. Thereafter, the individual associated with the recipient electronic device is presented with the result of the data capture (e.g., a digital receipt or advertisement).

In FIG. 9, two different use cases are shown. The first use case pertains to special offers via advertising interfaces (also called "advertising screens"). Assume, for example, that an individual passes an advertising screen 902a during a routine journey on public transit (e.g., a subway or bus). This advertising screen 902a may be representative of a source electronic device. A recipient electronic device 904a associated with the individual may proactively scan the ambient environment every several seconds to identify the presence of visual codes. On public transit, content of the source electronic device 902a has been modified so that flash codes relevant to the displayed advertisement can be embedded in the video signal. The advertisements may prompt nearby individuals to check their respective recipient electronic devices 904a-c for surprise discounts or promotions on the products offered. As mentioned above, sensors—like the mmWave radar sensor—can detect modifications in video signals without removal from the pants, jacket, etc. Thus, without needing to be removed from the pocket, the recipient electronic device 904a can detect the information from the flash code and then store the information for subsequent use (e.g., if the information pertains to an offer or promotion). Later, the individual may check a computer program (e.g., a payment application) executing on the recipient electronic device in order to see whether the information can still be used.

The second use case pertains to digital receipts on legacy payment systems. Assume, for example, that an individual who has access to a mobile phone 904d shops at a store. Then, assume that a computer program that is executing on the mobile phone 904d and permits payments to be made digitally has the reading capability enabled. This computer program may be called a "payment application." In such a scenario, when the individual is determined to be proximate to a payment system, the payment application may initiate a detection function supported by a mmWave radar sensor included in the mobile phone 904d. When the individual's transaction is processed by the payment system, modified firmware can cause it to embed a code representing the items purchased, transaction amount, and time stamps. The individual may complete the transaction using a payment card (e.g., a credit card or debit card) that is programmatically associated with the payment application. The visual code output by the source electronic device 902b can be read by the recipient electronic device 904b. Moreover, the payment application may be able to match their outgoing payment to the item list and time code. This may be true even if the recipient electronic device detects multiple different data packets during the time near the payment system. The individual can therefore be offered a digital receipt.

Processing System

Figure 10:
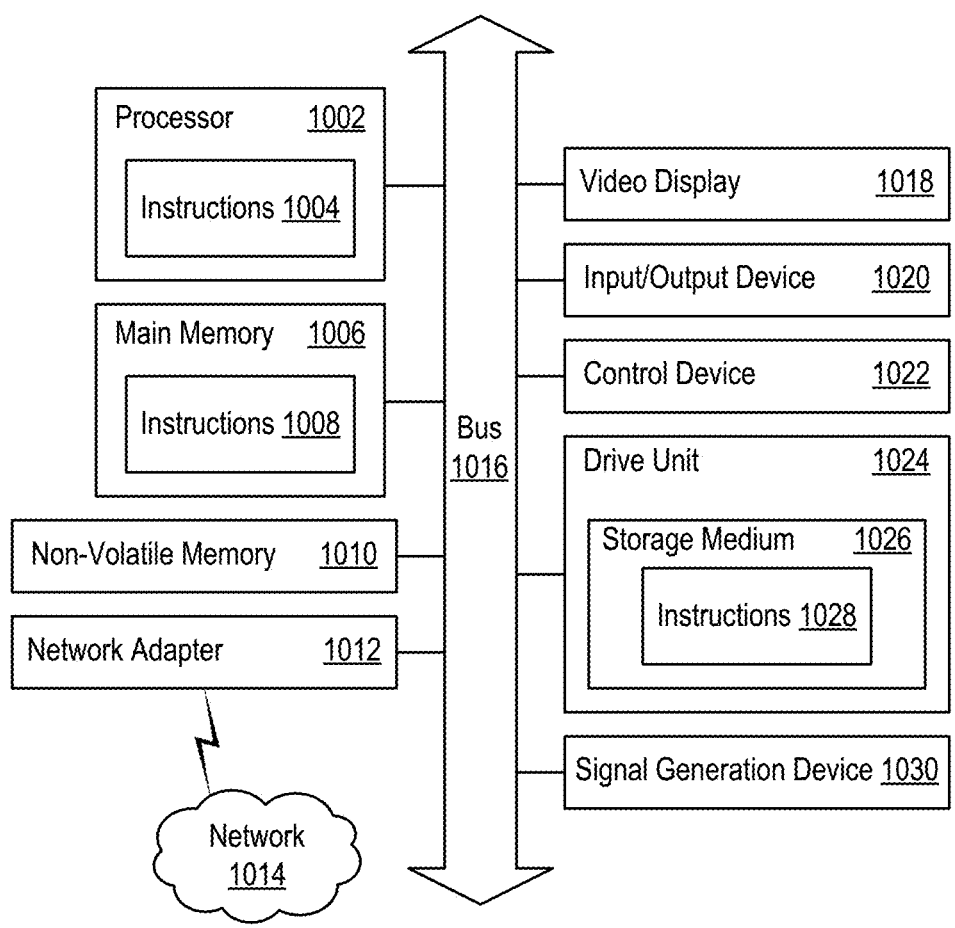
FIG. 10 is a block diagram illustrating an example of a processing system that is able to implement at least some of the operations described herein.

FIG. 10 is a block diagram illustrating an example of a processing system 1000 in which at least some operations described herein can be implemented. For example, components of the processing system 1000 may be hosted on an electronic device that includes a video output component or an audio output component. As another example, components of the processing system 1000 may be hosted on an electronic device that includes a manipulation platform that is capable of manipulating an interfacing signal that is audibly or visually detectable by another electronic device for information transfer purposes.

The processing system 1000 may include a processor 1002, main memory 1006, non-volatile memory 1010, network adapter 1012 (e.g., a network interface), video display 1018, input/output device 1020, control device 1022 (e.g., a keyboard, pointing device, or mechanical input such as a button), drive unit 1024 that includes a storage medium 1026, or signal generation device 1030 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit ($I^2C$) bus, or bus compliant with IEEE Standard 1394.

The processing system 1000 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 1000.

While the main memory 1006, non-volatile memory 1010, and storage medium 1024 are shown to be a single medium, the terms "storage medium" and "machine-readable medium" should be taken to include a single medium or multiple media that stores one or more sets of instructions 1026. The terms "storage medium" and "machine-readable medium" should also be taken to include any medium that is capable of storing, encoding, or carrying a set of instructions for execution by the processing system 1000.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memories and storage devices in a computing device. When read and executed by the processor 1002, the instructions cause the processing system 1000 to perform operations to execute various aspects of the present disclosure.

While embodiments have been described in the context of fully functioning computing devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile memory devices, non-volatile memory devices 1010, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

The network adapter 1012 enables the processing system 1000 to mediate data in a network 1014 with an entity that is external to the processing system 1000 through any communication protocol supported by the processing system 1000 and the external entity. The network adapter 1012 can include a network adaptor card, a wireless network interface card, a switch, a protocol converter, a gateway, a bridge, a hub, a receiver, a repeater, or a transceiver that includes a chip (e.g., enabling communication over Bluetooth, Wi-Fi, or NFC).

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a first electronic device, the method comprising:
    outputting a first signal that is representative of a video signal that is visually perceptible to a user and that is displayed by a video output component of the first electronic device;
    receiving input that is indicative of an instruction to communicate information related to content of the first signal to a second electronic device that is located in proximity to the first electronic device;
    superimposing a second signal that is visually imperceptible to the user and that is indicative of the information on the first signal, so as to generate a third signal,
        wherein said superimposing causes a visual modification to be introduced to the video signal over an interval of time, and
        wherein the visual modification only affects a portion of each frame of the video signal that is included in the interval of time; and
    outputting the third signal for detection by the second electronic device, such that the second electronic device is able to detect the second signal despite the second signal being visually imperceptible to the user.

2. The method of claim 1, wherein the second signal is superimposed on the first signal in such a manner that modification of the first signal is not visually perceptible to the user.

3. The method of claim 1, wherein said superimposing comprises:
    identifying the interval of time over which to superimpose the second signal based on an analysis of content of the first signal, and
    combining the first signal and the second signal such that the second signal coincides with the interval of time.

4. The method of claim 1, wherein (i) content of the second signal or (ii) a manner in which the second signal is superimposed on the first signal causes the second signal to be uniquely associated with the second electronic device.

5. A non-transitory medium with instructions stored thereon that, when executed by a processor of an electronic device, cause the electronic device to perform operations comprising:
    outputting a first signal that is representative of a video signal that is visually detectable by a user and that is displayed by a video output component of the electronic device;
    receiving input indicative of an instruction to communicate information to another electronic device;
    superimposing a second signal that is not visually detectable by the user and that is indicative of the information on the first signal, so as to generate a third signal,
        wherein said superimposing causes a visual modification to be introduced to the video signal over an interval of time, and
        wherein the visual modification only affects a portion of each frame of the video signal that is included in the interval of time; and
    outputting the third signal for detection by the other electronic device, such that the other electronic device is able to detect the second signal despite the second signal not being visually detectable by the user.

6. The non-transitory medium of claim 5, wherein the operations further comprise:
    identifying a section of the first signal over which to superimpose the second signal by examining content of the first signal in real time.

7. The non-transitory medium of claim 5, wherein the operations further comprise:
    identifying the interval of time over which to superimpose the second signal based on an analysis of content of the first signal; and
    combining the first signal and the second signal, such that the second signal coincides with the interval of time.

8. The non-transitory medium of claim 5, wherein the operations further comprise:
identifying, based on a characteristic of the electronic device, a modulation scheme for communicating the information to the other electronic device;
wherein said superimposing is performed in accordance with the modulation scheme.

9. The non-transitory medium of claim 8, wherein the characteristic is display size, display type, model, or intended application.

10. The non-transitory medium of claim 8, wherein the modulation scheme specifies at least one characteristic of the second signal.

11. The non-transitory medium of claim 5, wherein the second signal is one of multiple signals that are superimposed on the first signal, and therefore included in the third signal.

12. The non-transitory medium of claim 11, wherein each signal of the multiple signals corresponds to a different interval of time over which the third signal is output for detection by the other electronic device.

* * * * *